US011978312B2

(12) United States Patent
Thomas et al.

(10) Patent No.: US 11,978,312 B2
(45) Date of Patent: May 7, 2024

(54) SYSTEMS AND TECHNIQUES FOR WAGER-ASSOCIATED PARAMETER CONTROL GRAPHICAL STATE MANAGEMENT

(71) Applicant: Aristocrat Technologies, Inc., Las Vegas, NV (US)

(72) Inventors: Alfred Thomas, Ventura, CA (US); Joel Osmond, Quakers Hill (AU); Mercedes De Lugo, Las Vegas, NV (US); Sony Syamala, Las Vegas, NV (US); Natalie Bryant, Cherrybrook (AU)

(73) Assignee: Aristocrat Technologies, Inc., Las Vegas, NV (US)

( * ) Notice: Subject to any disclaimer, the term of this patent is extended or adjusted under 35 U.S.C. 154(b) by 441 days.

(21) Appl. No.: 15/929,911

(22) Filed: May 28, 2020

(65) Prior Publication Data

US 2021/0375094 A1 Dec. 2, 2021

(51) Int. Cl.
*G07F 17/32* (2006.01)

(52) U.S. Cl.
CPC ...... *G07F 17/3244* (2013.01); *G07F 17/3209* (2013.01); *G07F 17/3213* (2013.01); *G07F 17/3267* (2013.01)

(58) Field of Classification Search
CPC ............. G07F 17/3209; G07F 17/3213; G07F 17/3244; G07F 17/3267; G07F 17/3269; G07F 17/3227; G07F 17/3211; G07F 17/3216; G07F 17/3223
USPC ........................................................... 463/25
See application file for complete search history.

(56) References Cited

U.S. PATENT DOCUMENTS

| | | | | |
|---|---|---|---|---|
| 5,429,361 | A * | 7/1995 | Raven | G07F 9/08 463/25 |
| 6,358,144 | B1 * | 3/2002 | Kadlic | A63F 3/00157 273/306 |
| 7,618,319 | B2 | 11/2009 | Casey | |
| 7,887,417 | B2 | 2/2011 | Tyndall | |
| 8,814,676 | B2 | 8/2014 | De Courssou | |
| 8,826,169 | B1 | 9/2014 | Yacoub | |
| 9,582,181 | B2 | 2/2017 | Yoon | |
| 9,613,193 | B1 | 4/2017 | Harter | |
| 9,633,508 | B2 | 4/2017 | Johnson | |

(Continued)

OTHER PUBLICATIONS

Mantini, Joan, "The latest trends in slot cabinet design," Casino Journal, Feb. 21, 2019, 7 pages.

(Continued)

*Primary Examiner* — Justin L Myhr
(74) *Attorney, Agent, or Firm* — Weaver Austin Villeneuve & Sampson LLP

(57) ABSTRACT

Provided herein are systems and techniques for providing for wager-associated parameter control graphical state management. In such systems and techniques, a portion of one or more displays of an electronic gaming machine that is used to display all or part of a virtual button deck may be transitioned between two graphical states—one in which wager-associated parameter controls are in default positions and enabled for selection by users, and the other in which such controls are minimized or hidden and their wager-associated parameter functionality is disabled or otherwise non-usable by users.

20 Claims, 11 Drawing Sheets

(56) References Cited

U.S. PATENT DOCUMENTS

| | | | | |
|---|---|---|---|---|
| 9,641,666 | B2 | 5/2017 | Higashibeppu | |
| 9,733,827 | B2 | 8/2017 | Borovsky | |
| 10,198,569 | B2 | 2/2019 | Farraro | |
| 2004/0082384 | A1 * | 4/2004 | Walker | G07F 17/3239 463/40 |
| 2005/0059458 | A1 * | 3/2005 | Griswold | G07F 17/32 463/16 |
| 2006/0199635 | A1 * | 9/2006 | Radek | G07F 17/3262 463/20 |
| 2007/0060282 | A1 * | 3/2007 | Okada | G07F 17/3267 463/17 |
| 2010/0255912 | A1 * | 10/2010 | Ward | G07F 17/3244 463/36 |
| 2011/0111852 | A1 * | 5/2011 | Cohen | G07F 17/3202 463/37 |
| 2013/0212532 | A1 | 8/2013 | Hsieh | |
| 2014/0201681 | A1 | 7/2014 | Mahaffey | |

OTHER PUBLICATIONS

"IGT CrystalCurve ULTRA Gaming Machine" Brochure, IGT, 2017, 2 pages.

"IGT CrystalCurve ULTRA Lock Bet Panel Feature," Jan. 25, 2021, 3 pages.

* cited by examiner

SYSTEMS AND TECHNIQUES FOR WAGER-ASSOCIATED PARAMETER CONTROL GRAPHICAL STATE MANAGEMENT

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Systems and techniques are disclosed for providing graphical state management of wager-associated parameter controls on virtual button decks for electronic gaming machines. In such implementations, graphical states for wager-associated parameter controls, i.e., user-selectable controls that affect the bet level of a wager, such as controls for selecting a denomination, a bet multiplier, a number of paylines played per play, etc., that are part of a virtual button deck may be modified to cause such controls to be resized, moved, or hidden from view under certain conditions. Similarly, such controls may be caused to be restored to their default or "in-use" positions when one or more triggering conditions are met. The area of the screen used to display such controls when the controls are in their in-use positions may, in some implementations, be used to display other content, e.g., game-related animations, streamed video content, news, a chat window, or any other desired content.

Such systems and techniques allow for controls for modifying wager-associated parameters to be transitioned between two graphical states-one in which they are positioned in their in-use positions and fully enabled for use, and another in which they are generally resized, relocated, and/or hidden such that those controls are no longer in an "in-use" configuration and cannot be interacted with for their normal functionality, i.e., to alter wager-associated parameters. Such systems and techniques may provide at least two benefits—the first is that the possibility of an inadvertent activation of such a wager-associated parameter modification control may be reduced or eliminated, thus resulting in fewer undesired changes in bet level for players. The second is that, in many such implementations and as mentioned above, the screen real-estate used to display such controls may be repurposed to show other content when such controls are not in the "in-use" configuration.

Such systems and techniques may be configured to switch between the two graphical states responsive to any number of triggering conditions being met. In addition to triggering conditions that are reflective of specific user inputs requesting a change in the graphical states, such triggering conditions may also, in some implementations, be provided by changes in game state, changes in electronic gaming machine reservation state, changes in available credits, changes in process execution status, etc. The following implementations are representative of at least some of the specific implementations contemplated herein, although it will be understood that other implementations not specifically listed below but otherwise apparent from the Figures and Detailed Description are also within the scope of this disclosure.

In some implementations, an electronic gaming system may be provided that may include one or more displays and a game controller that may include one or more processors and one or more memory devices. A first portion of the one or more displays may be oriented in a generally upright manner and a second portion of the one or more displays may be located below the first portion of the one or more displays and may include a surface that may be generally horizontal. The one or more processors, the one or more memory devices, and the one or more displays may be operably connected, and the one or more memory devices may store computer-executable instructions for controlling the one or more processors to: cause a first wagering game to be presented via first graphical content displayed within at least the first portion of the one or more displays, cause second graphical content displayed in the second portion of the one or more displays to transition from a first graphical state to a second graphical state responsive to a determination that one or more first trigger conditions are met, and cause the second graphical content displayed in the second portion of the one or more displays to transition from the second graphical state to the first graphical state responsive to a determination that one or more second trigger conditions are met. In such implementations, a) the second graphical content displayed in the second portion of the one or more displays in the first graphical state may include a first set of one or more graphical objects that may include a first graphical object representing a first user-selectable wager-associated parameter control, b) the second graphical content displayed in the second portion of the one or more displays in the second graphical state may differ from the second graphical content displayed in the second portion of the one or more displays in the first graphical state at least in that the first graphical object experiences a change in one or more properties from the first graphical state to the second graphical state (with each property being a property related to size, location, visibility, or z-order), c) the first user-selectable wager-associated parameter control may, when the second graphical content displayed in the second portion of the one or more displays is in the first graphical state, be associated with a first touch-input region of the one or more displays, and d) the one or more memory devices may store further computer-executable instructions for controlling the one or more processors to cause a wager-associated parameter associated with the first wagering game to change responsive to a determination that a touch input has been received via the first touch-input region of the one or more displays while the second graphical content displayed in the second portion of the one or more displays is in the first graphical state.

In some implementations of the electronic gaming system, the first set of one or more graphical objects may include a plurality of graphical objects, and the second graphical content displayed in the second portion of the one or more displays in the second graphical state may differ from the second graphical content displayed in the second portion of the one or more displays in the first graphical state in that all of the graphical objects in the plurality of graphical objects experience a change in one or more properties from the first graphical state to the second graphical state (with each property being related to size, location, visibility, and/or z-order).

In some implementations of the electronic gaming system, the plurality of graphical objects may include a plurality of additional user-selectable wager-associated parameter controls.

In some implementations of the electronic gaming system, the first graphical object may at least be visible in the first graphical state and non-visible in the second graphical state.

In some implementations of the electronic gaming system, the first graphical object may at least be located in a central region of the second portion of the one or more displays in the first graphical state and in a peripheral region of the second portion of the one or more displays in the second graphical state.

In some implementations of the electronic gaming system, the first graphical object may at least be located in between first portion of the one or more displays and the central region of the second portion of the one or more displays in the second graphical state.

In some implementations of the electronic gaming system, the first graphical object may at least be a first size in the first graphical state and a second size in the second graphical state, and the first size may be larger than the second size.

In some implementations of the electronic gaming system, the one or more first trigger conditions may include a first trigger condition that may be met when a determination is made that a user input associated with a change display state control associated with the first set of one or more graphical objects is received.

In some implementations of the electronic gaming system, the one or more first trigger conditions may include a first trigger condition that may be met when a determination is made that a process executing on the electronic gaming system has entered a non-responsive state.

In some implementations of the electronic gaming system, the one or more first trigger conditions may include a first trigger condition that may be met when the electronic gaming system is placed into an audit mode.

In some implementations of the electronic gaming system, the one or more first trigger conditions may include a first trigger condition that may be met when the electronic gaming system is caused to perform a cashout process.

In some implementations of the electronic gaming system, the one or more first trigger conditions may include a first trigger condition that may be met when the electronic gaming system is placed into a reserved mode.

In some implementations of the electronic gaming system, the one or more first trigger conditions may include a first trigger condition that may be met when the electronic gaming system enters into a state such as an attract mode state, a first zero-credit state that is enabled when a credit meter of the electronic gaming system changes to a value of zero, or a second zero-credit state that is enabled when the credit meter of the electronic gaming system indicates a value of zero for at least a predetermined non-zero period of time.

In some implementations of the electronic gaming system, the one or more memory devices may store further computer-executable instructions for controlling the one or more processors to cause the electronic gaming system to enter, responsive to receipt of one or more inputs, a game selection state in which a wagering game selection lobby is caused to be presented via the one or more displays. The wagering game selection lobby may be configured to allow a player to select between the first wagering game and one or more other wagering games for play on the electronic gaming system, and the one or more first trigger conditions include a first trigger condition that may be met when the wagering game selection lobby is caused to be displayed.

In some implementations of the electronic gaming system, the one or more second trigger conditions may include a second trigger condition that may be met when a determination is made that a user input associated with a restore display state control associated with the first set of one or more graphical objects is received.

In some implementations of the electronic gaming system, the restore display state control and the change display state control may be the same control.

In some implementations of the electronic gaming system, the first wagering game may feature a plurality of bet levels, the first set of one or more graphical objects may include a plurality of graphical objects, the plurality of graphical objects may include the first graphical object and one or more additional graphical objects, each additional graphical object representing a different user-selectable wager-associated parameter control, the first user-selectable wager-associated parameter control and the one or more additional user-selectable wager-associated parameter controls may represent a graphical user interface that may be configured to receive one or more inputs indicating a selection of one of the bet levels for use in one or more plays of the first wagering game, and the one or more second trigger conditions may include a second trigger condition that may be met when a credit meter that indicates an amount of credit available for placing a wager in the first wagering game indicates a credit value that is lower than an amount of credit needed to place a bet based on the selected bet level.

In some implementations of the electronic gaming system, the one or more second trigger conditions may include a second trigger condition that may be met when the electronic gaming system enters into an attract mode.

In some implementations of the electronic gaming system, the one or more second trigger conditions may include a second trigger condition that may be met when a feature trigger occurs from within the first wagering game.

In some implementations of the electronic gaming system, the one or more second trigger conditions may include a second trigger condition that may be met when the electronic gaming system is in a reserved state and a timer associated with the reserved state reaches an expired state before the electronic gaming system is taken out of the reserved state.

In some implementations of the electronic gaming system, the one or more second trigger conditions may include a second trigger condition that may be met when a determination is made that one or more user inputs indicating a wager parameter change are received.

In some implementations of the electronic gaming system, the one or more second trigger conditions may include a second trigger condition that may be met when a determination is made that one or more user inputs indicating a denomination change are received.

In some implementations of the electronic gaming system, the one or more second trigger conditions may include a second trigger condition that may be met when X touch inputs are received within Y seconds within a region of the second portion of the one or more displays having a predetermined size, X is an integer greater than 1, Y is a value greater than 0, and none of the X touch inputs correspond in location with a displayed user-selectable control.

In some implementations of the electronic gaming system, the one or more memory devices may store further computer-executable instructions for controlling the one or more processors to cause the electronic gaming system to enter, responsive to receipt of one or more inputs, a game selection state in which a wagering game selection lobby is caused to be presented via the one or more displays, the wagering game selection lobby may be configured to allow a player to select between the first wagering game and one or more other wagering games for play on the electronic gaming system, and the one or more second trigger conditions include a second trigger condition that may be met when the wagering game selection lobby is caused to be displayed.

In some implementations of the electronic gaming system, the one or more memory devices may store further computer-executable instructions for controlling the one or more processors to: implement a platform layer that interfaces with hardware of the electronic gaming system, implement a game framework layer that provides commonly used subroutines for providing wagering game features, implement a host layer that provides for communication between the platform layer and the game framework layer, and implement a game layer that interfaces with the game framework layer and may be configured to make calls to the game framework layer to cause the game framework layer to present the first set of one or more graphical objects as part of the first graphical state for the second portion and to cause the one or more properties for the first graphical object to change from the first graphical state to the second graphical state.

In some implementations of the electronic gaming system, the game layer may be further configured to present the first set of one or more graphical objects by referencing a template and modifying the template according to commands received from the game layer.

In some implementations of the electronic gaming system, the one or more memory devices may store further computer-executable instructions for controlling the one or more processors to: implement a platform layer that interfaces with hardware of the electronic gaming system and may be configured to control the properties of at least one graphical object other than the first graphical object, implement a game framework layer that provides commonly used subroutines for providing wagering game features, implement a code layer that provides for communication between the platform layer and the game framework layer, and implement a game layer that interfaces with the game framework layer and may be configured to control the properties of at least the first graphical object.

DETAILED DESCRIPTION

Figure 1:
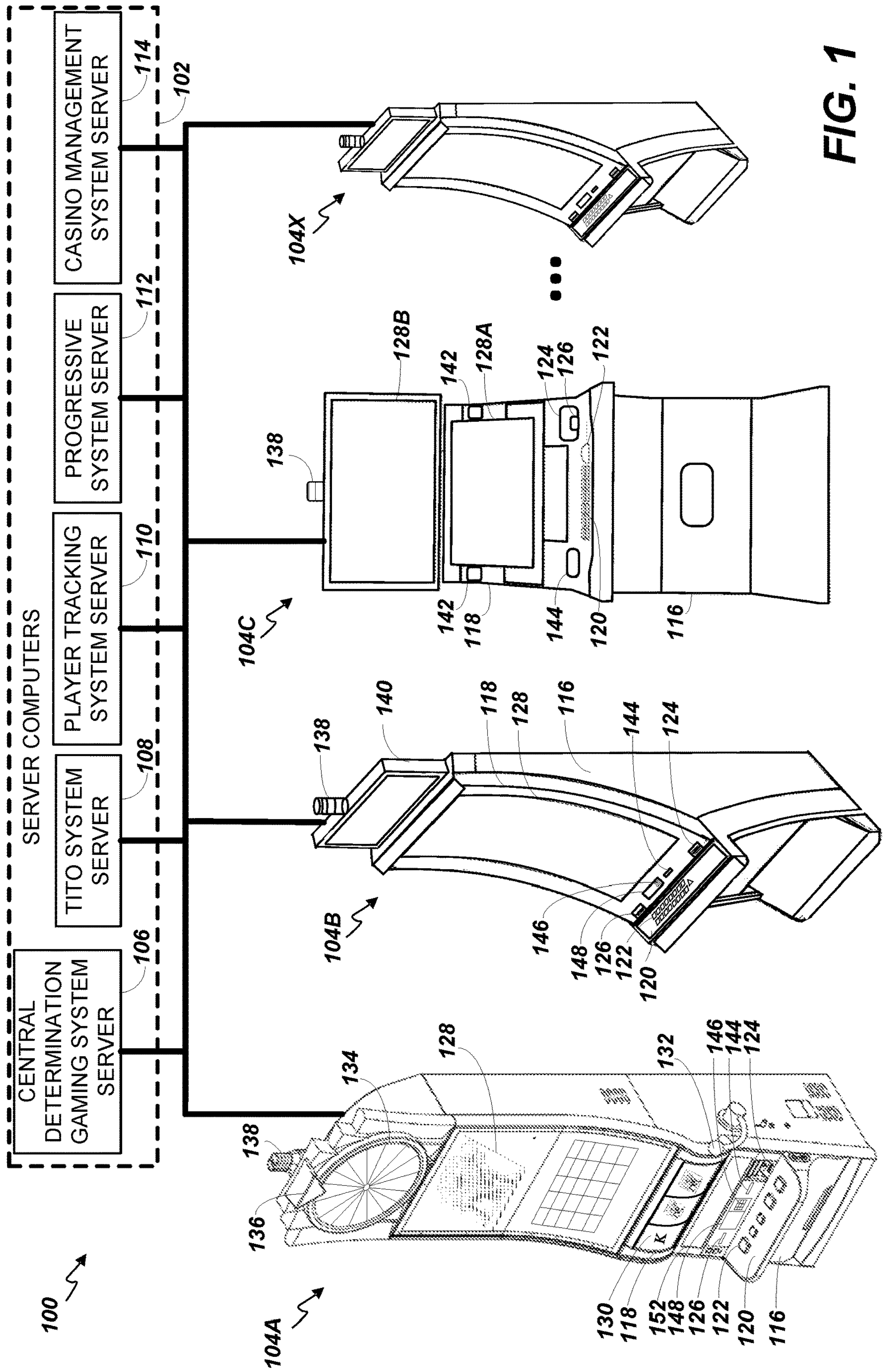
FIG. 1 is an exemplary diagram showing several EGMs networked with various gaming related servers.

As noted earlier, systems and techniques for providing graphical state management of wager-associated parameter controls on virtual button decks for electronic gaming machines are discussed below. In such implementations, graphical states for wager-associated parameter controls, i.e., user-selectable controls that affect the bet level of a wager, such as controls for selecting a denomination, a bet multiplier, a number of paylines played per play, etc., that are part of a virtual button deck may be modified to cause such controls to be resized, moved, or hidden from view under certain conditions.

For clarity, modern electronic gaming machines may allow users to modify various wager-associated parameters that govern what the overall bet level is for wagers placed on such machines. As used herein, the term "bet level" refers to the overall monetary amount that is wagered (or to be wagered) in a given wagering event, e.g., a spin of the reels on slot machine. The bet level may be determined by one or more wager-associated parameters. For example, one such wager-associated parameter is the denomination, which may sometimes be user-selectable. The denomination identifies the amount of real-world currency that is used to purchase a single unit of credit in a wagering game. For example, a wagering games typically operate using a placeholder currency referred to as "credits" or "coins"—the pay tables, credit meters, win announcements, and other systems of an electronic gaming machine typically provide information in terms of credits. The higher the denomination, the more real-world money is needed to purchase a credit; at the same time, the player will be awarded a corresponding higher amount of real-world money when cashing out such higher-denomination credits. Some wagering games may allow players to choose between different denominations, e.g., a player may choose between 1¢, 5¢, 10¢, or 25¢, so as to be able to tailor their game play to their particular financial considerations.

Another common wager-associated parameter is a multiplier value, which may be a value that may define the number of credits that may be wagered in a given wagering opportunity. For example, a very simple slot machine game may have a single "payline" that extends horizontally across the middle of the reel display; any winning pattern of symbols that appears along that line may provide a payout to the player. The payline thus represents a wagering opportunity, and using a multiplier may allow the player to, in effect, increase the number of credits that are wagered on that wagering opportunity. For example, a player might be able to choose between wagering 1 credit, 2 credits, 3 credits, etc. on a given wagering opportunity. Such multiplier values allow players to change the actual amount of real-world currency that is bet on a particular wagering opportunity without necessarily changing the denomination.

Yet another common wager-associated parameter is the number of wagering opportunities that the player will place wagers on for each "play" of the wagering game. For example, most modern slot machines have multiple sets of paylines, each of which can serve as a source of a potential winning pattern. Each payline, for example, may include a different set of reel stop positions (visible positions in which reel symbols may stop after a reel spin is completed). If a winning pattern of symbols occurs within any such payline, the player will receive a payout. If a particular payline does not have a winning pattern, then the player will receive no payout for that payline. In some wagering games, a player may select between several different options for the number of paylines to be played, e.g., 5, 10, 15, 20, or 25—when the player initiates a play of the game, e.g., by pushing the "play" button, wagers are placed (according to whatever other wager-associated parameters have been set) on each payline to be played. For example, if a player who has selected a 50 denomination and a 3× multiplier elects to wager on 10 paylines each play, a single play of the wagering game under such wager-associated parameter selections will result in a bet level of $1.50 (3×5¢ repeated for 10 paylines) and, in effect, making 10 separate 15¢ bets that are determined according to a single random outcome.

There may be other types of wager-associated parameters that may be modified via controls featured on a virtual button deck as well which are not described above but are nonetheless considered to be within the scope of this disclosure. It will also be recognized that while the user-selectable denomination, multiplier, and payline wager-associated parameters discussed above may be used in concert to determine bet level for a wagering game, other wagering games may use a subset of such parameters, or even only a single parameter, to determine bet level. For example, a wagering game might offer only a single denomination (and thus no ability for the user to select between different denominations), a single payline, or no multiplier value.

In wagering games that allow for user modification of one or more wager-associated parameters, the virtual button deck may be configured to display one or more user-selectable controls that allow the user to alter such wager-associated parameters. As discussed above, such wager-associated controls may be hidden under certain conditions.

Similarly, such controls may also be caused to be restored to their default or "in-use" positions when one or more triggering conditions are met. The area of the screen used to display such controls when the controls are in their in-use positions may, in some implementations, be used to display other content, e.g., game-related animations, streamed video content, news, a chat window, or any other desired content.

Such systems are discussed below in further detail. Prior to such discussion, however, a general overview of electronic gaming machine systems and wagering game play is presented to give more context to the systems and techniques for graphical state management of wager-associated parameter controls disclosed later herein.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
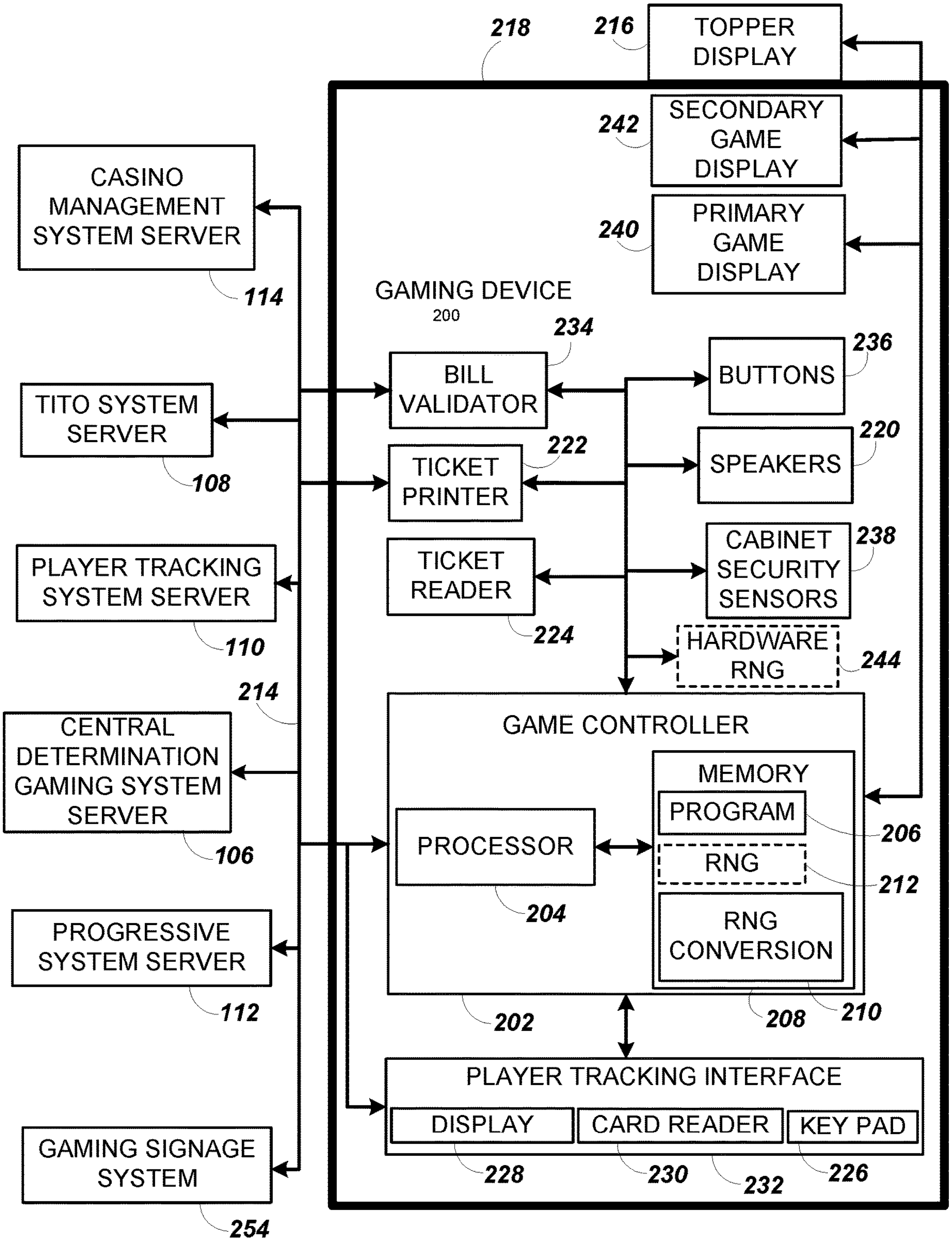
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
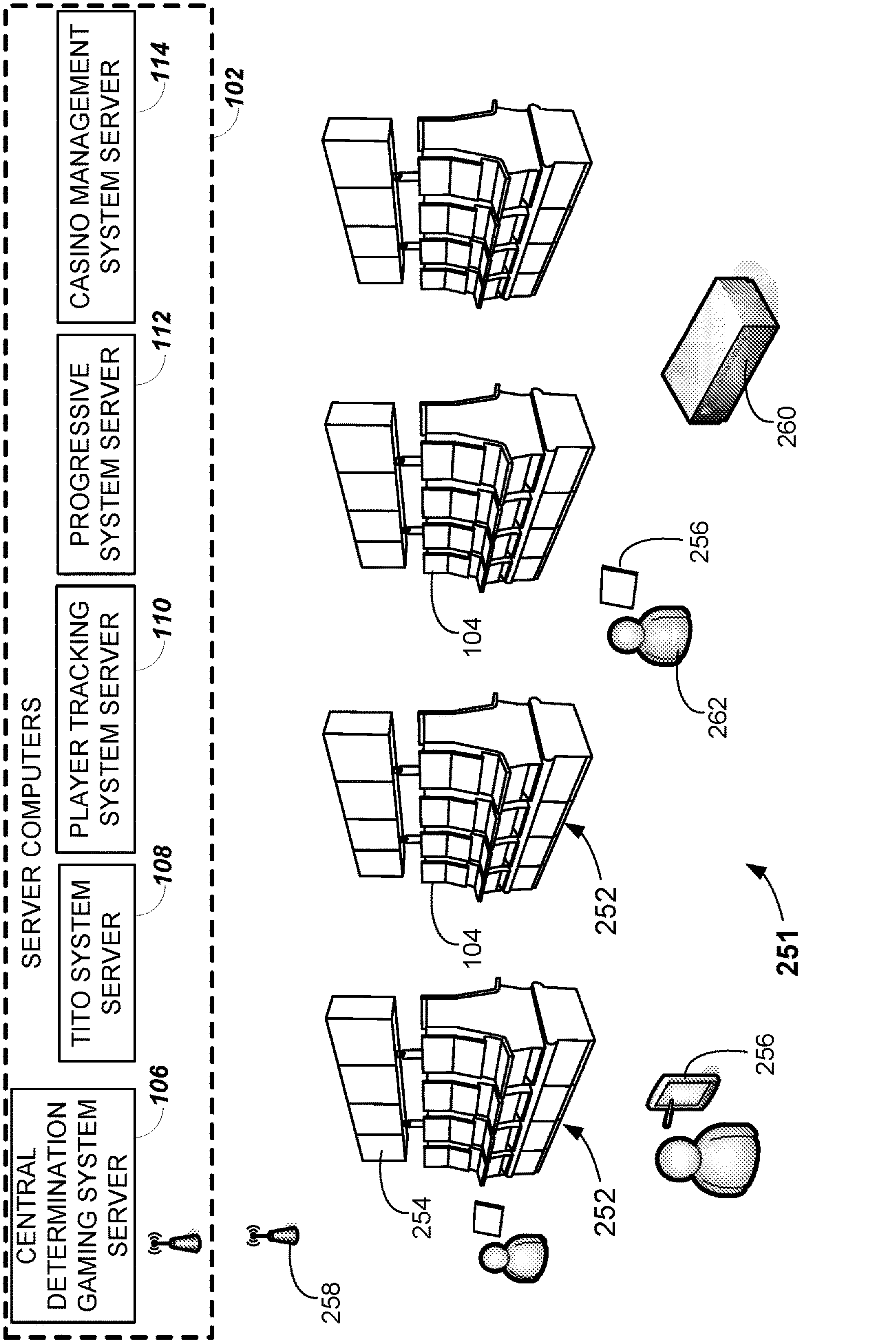
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
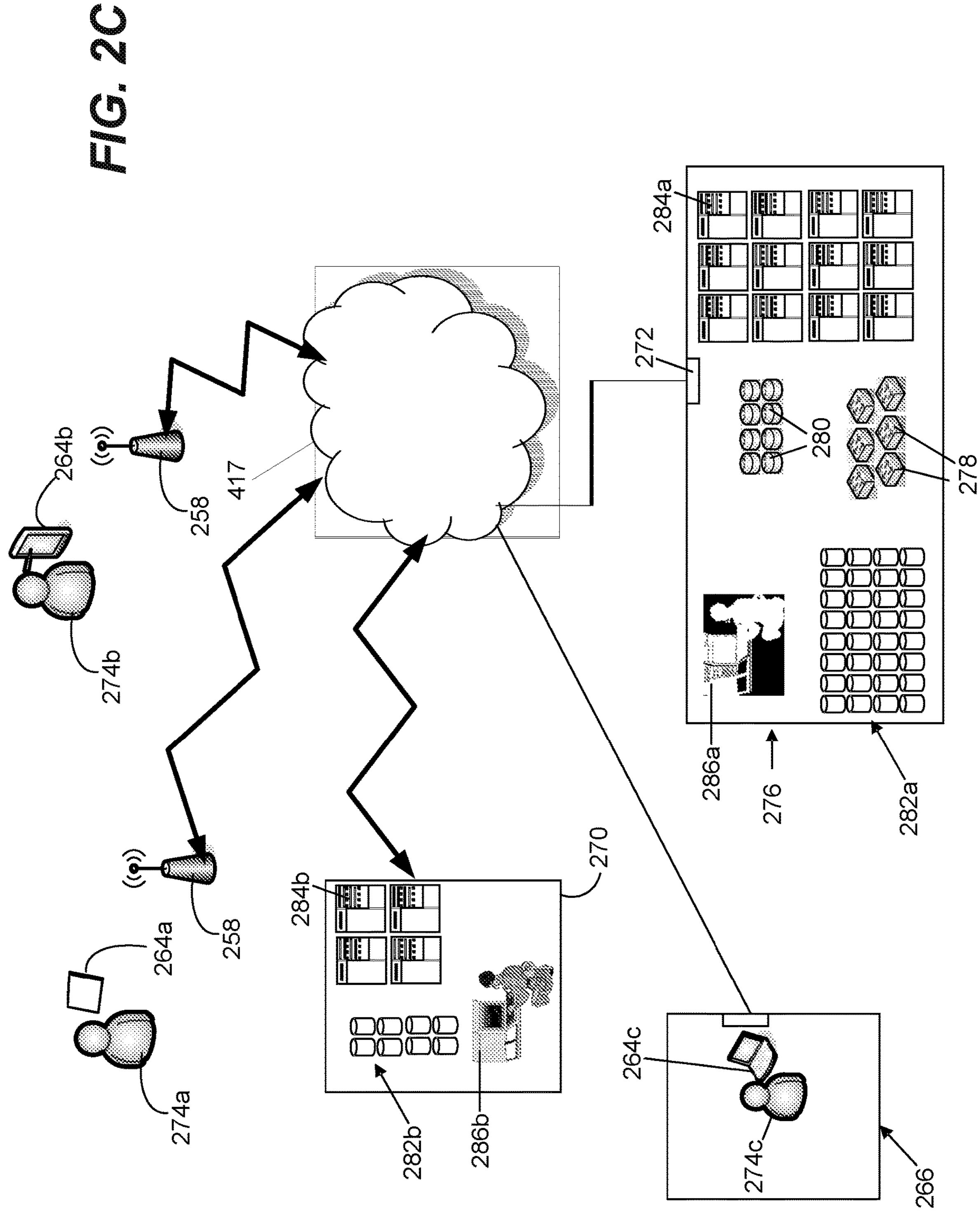
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

As noted earlier, some electronic gaming machines may feature a "virtual button deck," which may be a separate touch-screen display from the main display(s) of the EGM used to display the majority of the content related to a wagering game. Such virtual button deck displays are typically significantly smaller in size that the main display(s) of the EGM and may be oriented to be in a generally horizontal orientation, e.g., to provide a comfortable surface on which a player may rest their hands or forearms, or potentially place food or drink, when playing a wagering game on the EGM. It will be understood that virtual button decks do not need to be exactly horizontal, and may, for example, be sloped, e.g., by ~10°, for aesthetic or ergonomic purposes. It will be further understood that virtual button decks also do not necessarily need to be planar but may also be provided using a slightly or partially curved display.

Figure 3:
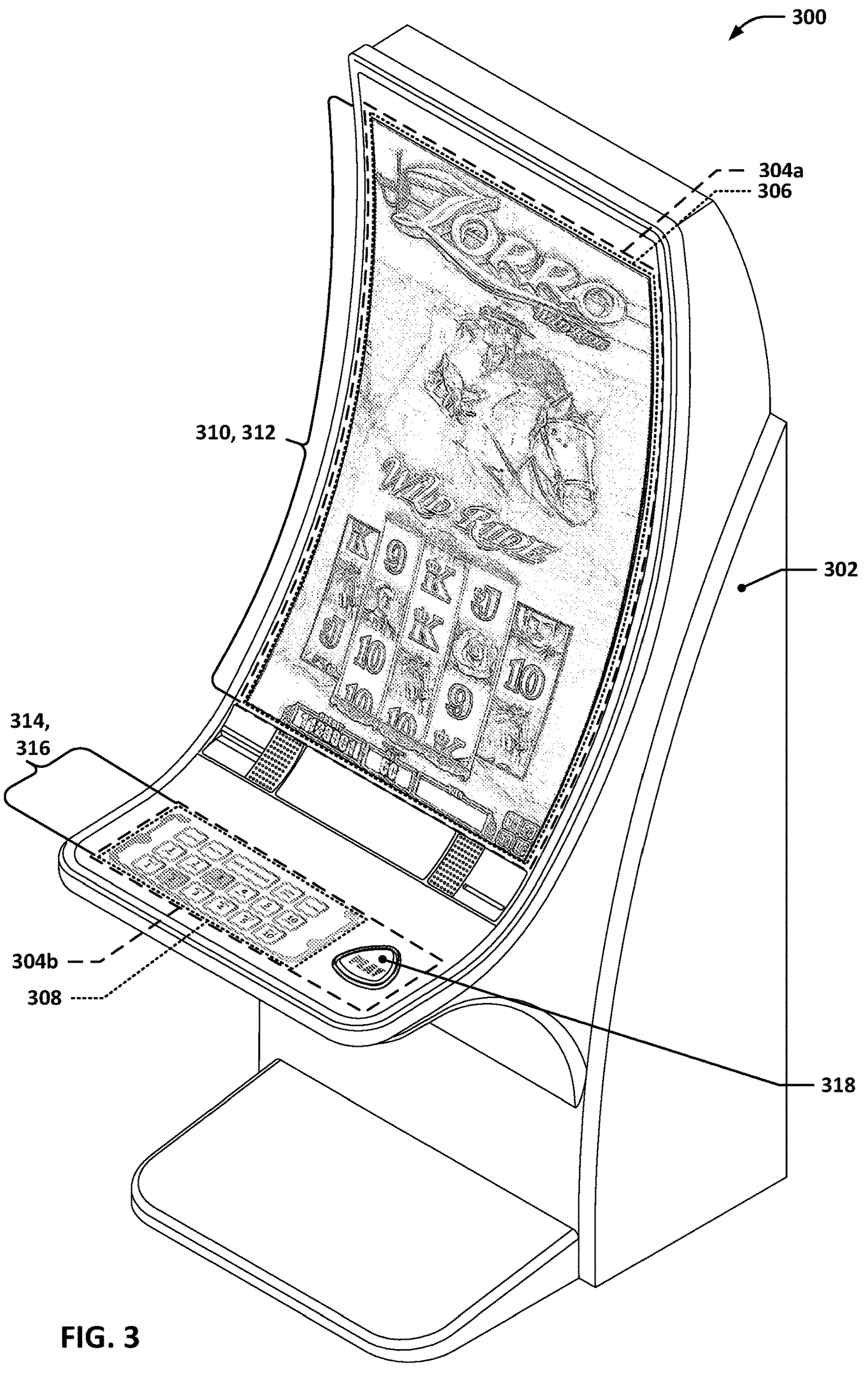
FIG. 3 depicts an example electronic gaming machine.

FIG. 3 depicts an example EGM 300 having a cabinet 302 housing two displays 304. In this example, the upper display 304*a* may represent a first portion 306 of the collective displays of the EGM 300 and the lower display 304*b* may represent a second portion 308 of the collective displays of the EGM 300. The first portion 306, in this case, is coextensive with the upper display 304*a*, and serves as the main game display area. The first portion 306 may be used to display first graphical content 310, for example, which may be a wagering game 312.

As can be seen, the first portion 306 is oriented in a generally upright orientation, e.g., such that a person sitting or standing in front of the EGM 300 and looking forward is able to easily see the content displayed on the first portion 306. As can be seen, such an orientation may include, for example, orienting the first portion 306 such that it is at an angle of 80° to 90° relative to horizontal. Other orientations are possible as well, although such orientations will generally be at more than 45° from horizontal. The first portion 306 may also be non-planar, e.g., provided by a curved display (such as is shown in FIG. 3), although still generally upright in orientation.

The second portion 308, in this example, is a sub-region of the lower display 304*b* that is used to display user-selectable controls for modifying various wager-associated parameters and to access other features of the EGM 300. The wager-associated parameters may include, for example, a selected denomination, a selected multiplier level, a selected number of paylines setting, and so forth. The second portion 308 may display second graphical content 314 which, in this example, provides part of the GUI for a virtual button deck (VBD) 316. The VBD 316 may also be provided in part by additional graphical content, such as play button 318 (in this case, the play button 318 is a hybrid button that includes a transparent, movable, physical button component that overlays graphical content displayed on the lower display 304*b*; pressing the physical button may cause a corresponding touch input to be provided to a touch-screen interface that overlays the lower display 304*b*, much as if a person touched the touch-screen interface in that area directly).

Figure 4:
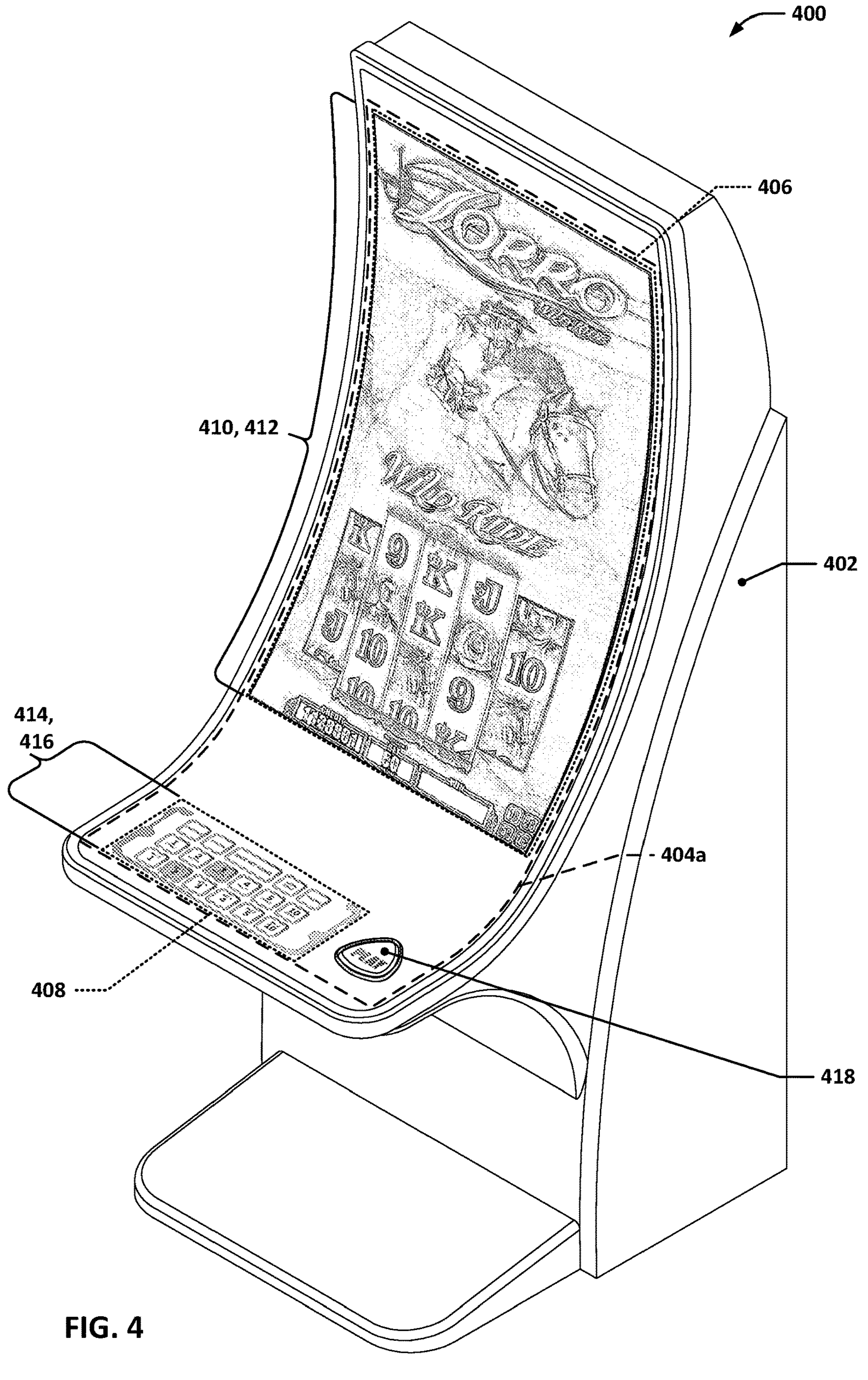
FIG. 4 depicts another example electronic gaming machine.

As can partially be seen from FIG. 3, the first and second portions may occupy all or part of a given display screen, e.g., the first portion 306 occupies all of the upper display 304*a*, whereas the second portion 308 occupies a sub-region of the lower display 304*b*; the reverse may also be the case—or both the first portion 306 and the second portion 308 may both fully occupy a corresponding display or may both occupy sub-regions of separate displays. In fact, in some implementations, the first portion 306 and the second portion 308 may be sub-regions of the same display screen. For example, FIG. 4 depicts an example EGM 400 that has a cabinet 402 with a single, curved display 404 that has both a generally vertically oriented first portion 406 and a generally horizontally oriented second portion 408; the display 404 bends in between the first portion 406 and the second portion 408. The first portion 406 is used to display first graphical content 410, which may depict a wagering game 412. The second portion 408 is used to display second graphical content 414, some of which may depict a virtual button deck 416. The virtual button deck 416 does not, in this example, have a physical button overlay for the play button 418. The techniques discussed herein may be applied in the context of any such implementations of an EGM, as well as other EGM configurations not specifically mentioned herein.

Virtual button decks like the VBD 316 provide an extremely flexible mechanism for facilitating user interaction with an EGM such as the EGM 300. Prior to the introduction of virtual button decks, EGMs typically had a physical button deck that consisted of a plurality of mechanical buttons that were arranged across a generally horizontal surface. Such mechanical buttons could be pressed by users to make various selections that controlled how the EGM operated, e.g., to modify various wager-associated parameters. Users became used to the physical feel of such buttons, and the mechanical nature of the buttons required some level of physical force to be provided in order to activate the buttons. This provided a level of tactile feedback to users that let them know when they might be activating such a button and potentially making an unintended selection or modification of a wager-associated parameter. As such, while mechanical-button decks were relatively inflexible (often having static graphics and only a single button layout), they provided a reliable, and highly tactile user experience.

In contrast, virtual button decks provide nearly infinite customizability, as well as the ability to easily incorporate animated graphics, visual effects, and other features. However, virtual button decks do have one significant drawback, which is a general lack of tactile feedback. Tactile elements, such as the physical button overlay for the play button 318 discussed above, can be incorporated into a virtual button deck, but at the expense of sacrificing some of the flexibility and reconfigurability of such virtual button decks-once a physical button overlay is added to a virtual button deck, the physical button overlay must generally remain in place, preventing that region of the virtual button deck from being used for other purposes or obscuring non-button graphics that may be desired to be displayed in that location. The lack of such tactile elements makes it extraordinarily easy for a user to inadvertently select and activate a button control displayed on the virtual button deck and not realize it. As a result, a user of an EGM with a virtual button deck may unwittingly make wager-associated parameter modifications that result in the user either making a larger than desired bet (and potentially losing more than they anticipated losing should the wager be a losing wager) or a smaller than desired bet (and potentially not winning as much as they anticipated winning should the wager be a winning wager). Neither outcome is desirable.

For all their flexibility, virtual button decks are typically configured to replicate the appearance of traditional, physical button decks, featuring similar layouts of buttons to those found on such physical button decks. This is done to allow users to switch between EGMs having virtual button decks and physical button decks with a minimum of discomfort. Users that are familiar with older EGMs with physical button decks are thus able to play a virtual button deck-equipped EGM with little or no extra thought.

The systems and techniques discussed herein provide for virtual button decks where the graphical content used to depict wager-associated parameter controls may be transitioned between two graphical states (and the underlying touch-input interface as well as between various input-accepting states)—a first graphical state in which the graphical objects representing wager-associated parameter controls are displayed in default positions, e.g., in locations in which they would normally be located, and a second graphical state in one or more visual properties of the graphical objects representing wager-associated parameter controls are modified. These visual properties may, for example, include visibility, size, location, and/or z-order.

A "control," as the term is used herein, refers generally to a graphical object that is presented on-screen in order to allow a user to provide input, e.g., via a mouse click, keyboard, or touch-input. Controls may include, for example, virtual buttons, menus, sliders, dials, icons, etc. It will be understood that controls may be configured, in some instances, to not permit user input in some circumstances. Wager-associated parameter controls refer to controls that are provided to allow a user to modify various wager-associated parameters. While such wager-associated parameter controls are typically provided as simple buttons, usually in the form of one or more button option groups in which selection of any button in the option group causes any other selected button in the option group to be deselected, other implementations may feature other types of controls, e.g., a drop-down menu for picking between different wager-associated parameter values, +/− buttons for increasing/decreasing a wager-associated parameter value, multi-state buttons that sequentially progress to a different value of a range of different wager-associated parameter values with each user activation of that control, and so forth.

For clarity, the visibility property of a graphical object representing a wager-associated parameter control may govern whether or not the graphical object is even processed for rendering when a graphical scene is rendered for display-graphical objects with visibility properties set to false, for example, may be excluded from rendering of a scene in which they are located, effectively making them invisible. Similarly, graphical objects with a visibility property set to true, for example, may be included in the rendering of a scene in which they are located.

The z-order property of a graphical object, which may also be considered to be the z-axis positioning of the graphical object, may govern the apparent depth at which that graphical object is positioned within a graphical scene. As such, the z-order property may also be used as an alternative to the visibility property to make a graphical object appear visible or invisible in some circumstances. For example, if the z-order property of a graphical object is set so that the graphical object is located behind one or more other graphical objects that act to obscure it from view, then the graphical object will be hidden from view when a scene with that graphical object and that z-order property setting is rendered. Changing the z-order to move that graphical object "forward" in the scene, e.g., ahead of the graphical objects that may have previously obscured it when the scene was rendered, may cause the that graphical object to be visible when the scene is rendered.

The size and location properties of a graphical object may govern, as is likely evident from their names, the size of the graphical object and the positioning of the graphical object. The location properties of the graphical object, for example, may be XY coordinates that govern the two-dimensional position of the graphical object on a display or may, in some instances, be XYZ coordinates that may govern the position of the graphical object in a three-dimensional scene that is rendered and displayed on the display. In the latter case, the location properties may, in effect, also incorporate a z-order property as discussed above. The size properties of the graphical object may govern how large or small the graphical object is. In some implementations, the size properties of a graphical object may include a single value that governs the size of the graphical object in all directions, i.e., changing the size property may cause the graphical object to shrink or grow uniformly in all directions. In other or additional implementations, the size properties of a graphical object may include multiple values that may each govern the size of the graphical object in a different direction, e.g., one value that causes the graphical object to shrink or grow in width when changed and another value that causes the graphical object to shrink or grow in height when changed. In some cases, the size of a graphical object may be adjusted so that it becomes, in effect, infinitely thin, e.g., a line, or infinitely small, e.g., a point; such property settings may, for example, be used to provide a similar "hidden" effect to that discussed above with the visibility property or the z-order property.

Figure 5:
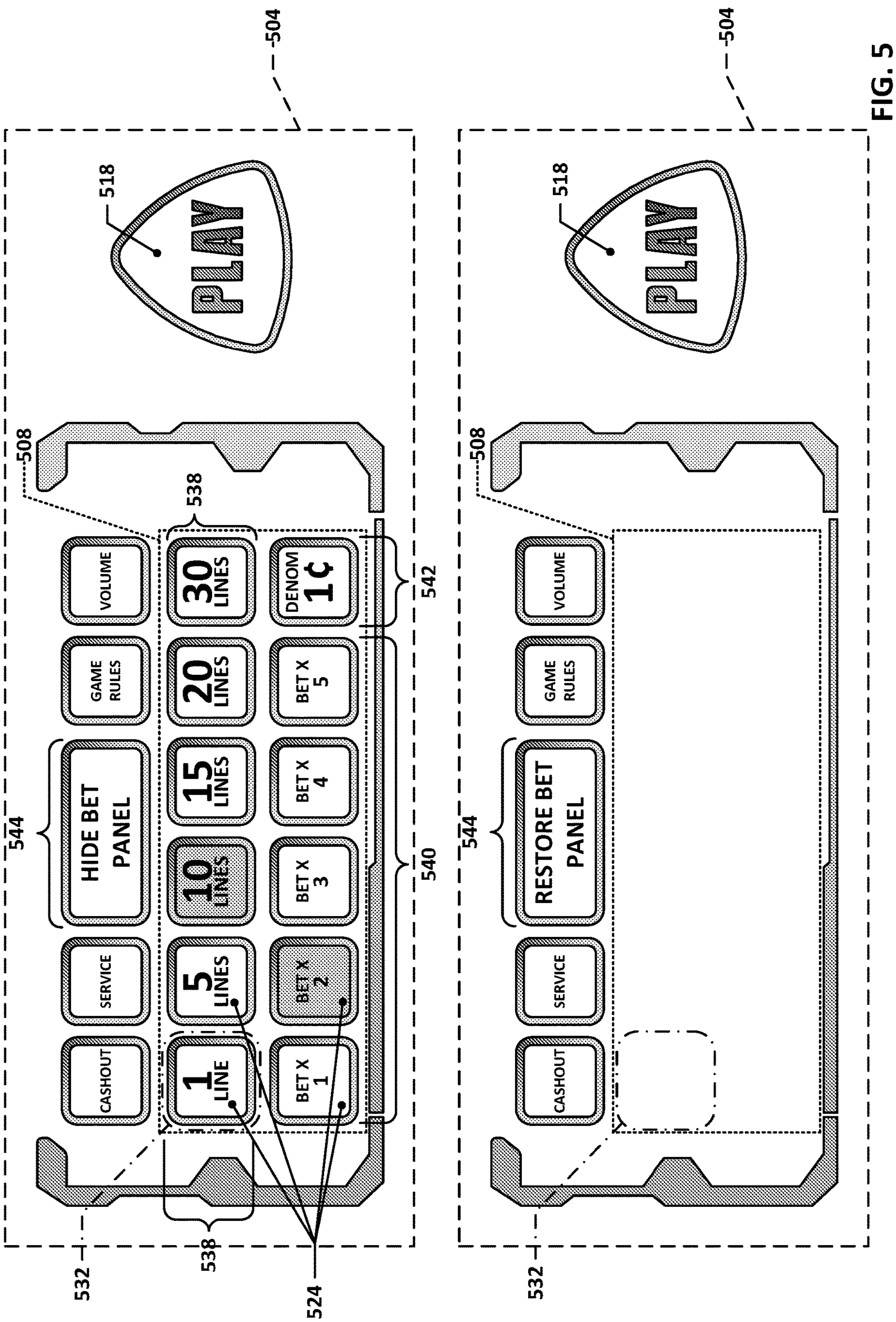
FIG. 5 depicts an example virtual button deck.
Figure 6:
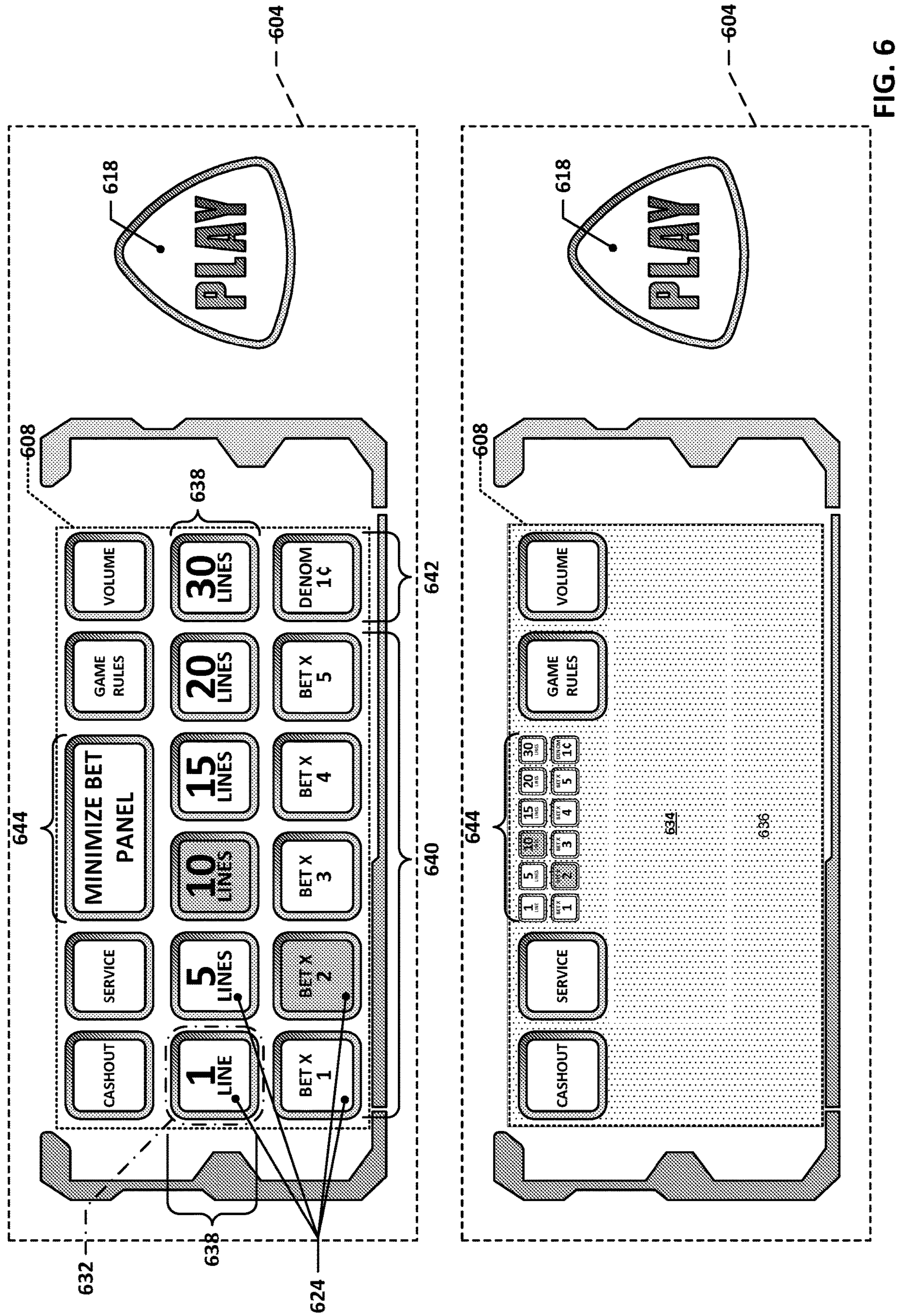
FIG. 6 depicts another example virtual button deck.
Figure 7:
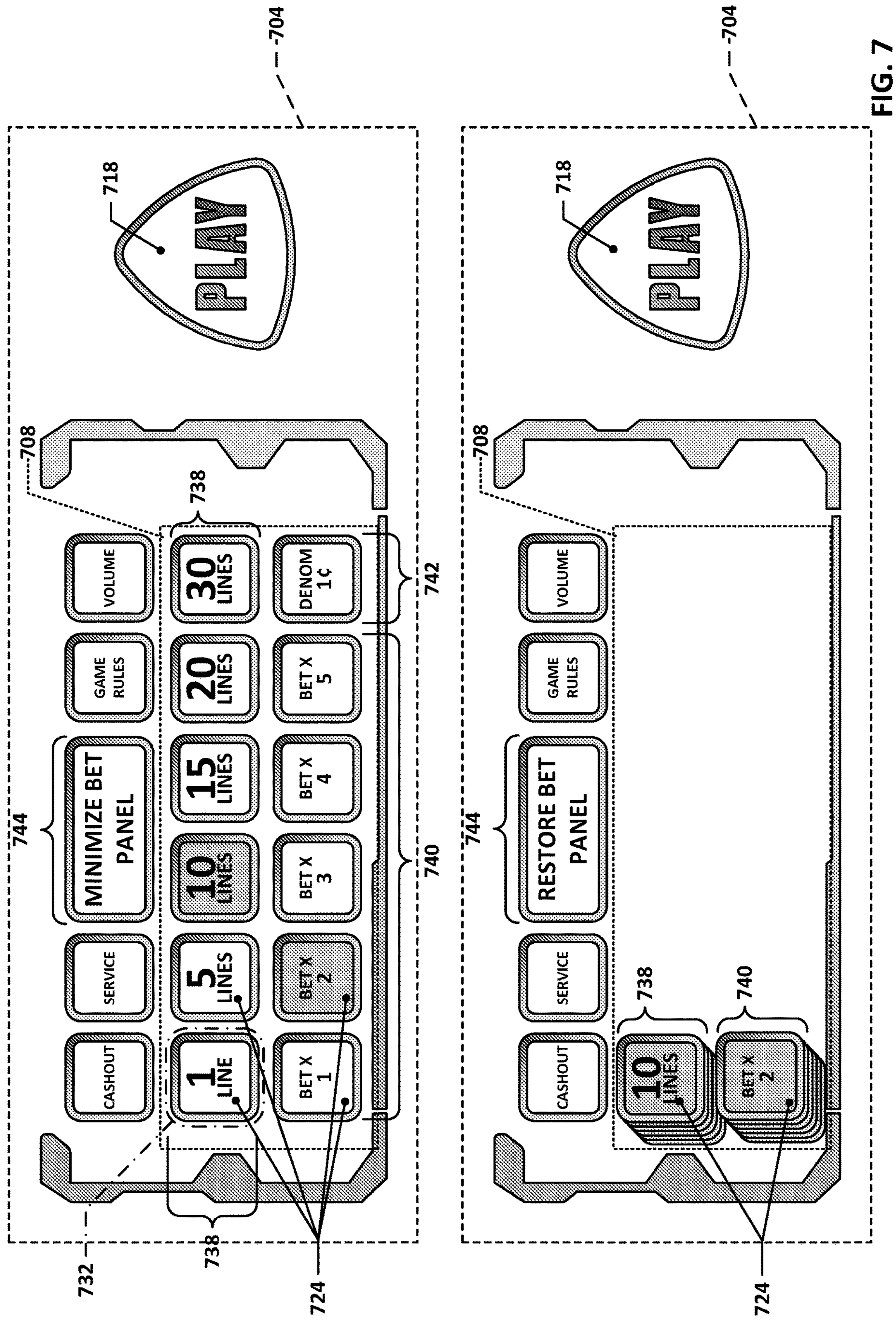
FIG. 7 depicts yet another example virtual button deck.

Several examples of such graphical state changes are discussed below with respect to FIGS. 5 through 7. Each of FIGS. 5 through 7 depicts a different example VBD having a second portion of one or more displays in two different graphical states—the second portion of the upper VBD in each figure is in a first graphical state, and the second portion of the lower VBD in each figure is in a second graphical state. For ease of reference, the following discussions may simply refer to the VBD as having the first or second graphical state, although it will be understood that this is intended to refer to the second portion of the one or more displays as having the first or second graphical state (the second portion of the one or more displays may generally form at least part of the VBD, although the VBD may also include portions of the one or more displays that are not in the second portion of the one or more displays—for example, the play button may be part of the VBD and not displayed in the second portion of the one or more displays).

FIG. 5 depicts a first example VBD that is configured to hide the wager-associated parameter controls when in the second graphical state. The example VBD 516 is shown in the context of a display 504; the display 504 displays first graphical content (as shown in the upper version of the VBD 516) when in a first graphical state and second graphical content (as shown the lower version of the VBD 516) when in a second graphical state. In the first graphical state, the VBD 516 can be seen to include a plurality of graphical objects 524 (only four are called out, but many more are shown) that represent user-selectable controls, e.g., play button 518, payline selection buttons 538, multiplier selection buttons 540, denomination selection button 542, and various other buttons, such as a game rules button, volume button, service button, and a cashout button. The VBD 516 also includes a graphical object representing a change display state control 544, e.g., a button, that may be selected by a user to cause the VBD 516 to switch from the first graphical state to the second graphical state. The payline selection buttons 538, the multiplier selection buttons 540, and the denomination selection button 542, in this example, are wager-associated parameter controls and are displayed within a second portion 508.

The second portion 508, in this case, is a region around the wager-associated parameter controls, generally circumscribing the wager-associated parameter controls. In some implementations, the second portion 508 may be the smallest rectangular area that fully overlaps all of the wager-associated parameter controls that are part of the VBD 516 in both the first graphical state and the second graphical state. For example, in FIG. 5, the second portion 508 is shown as a rectangular area that is the smallest rectangular area that fully overlaps all of the wager-associated parameter controls (it is actually shown as being a little larger so as to make it easier to discern it from other depicted elements in FIG. 5).

Each wager-associated parameter control shown in the first graphical state of the VBD 516 may have associated therewith a touch-input region, such as, for example, first touch-input region 532 for a first wager-associated parameter control having the label "1 LINE." Such touch-input regions may, for example, be coextensive with the limits of the graphical objects, or portions thereof, representing the wager-associated parameter controls. When the VBD 516 is in the first graphical state, the touch-input regions for the wager-associated parameter controls may be configured to receive user input, e.g., detect user touches, and convey that received input to one or more processors that control the display of the VBD 516. The one or more processors may then cause wager-associated parameters to be modified in response to receipt of that user input.

As can be seen, the first graphical state differs from the second graphical state in that the graphical objects 524 representing the wager-associated parameter controls, e.g., the payline selection buttons 538, the multiplier selection buttons 540, and the denomination selection button 542, have all had their properties changed such that those graphical objects 524 are no longer visible. For example, a visibility property of such graphical objects may have been set to "false" or the z-orders or locations of such graphical objects may have been altered so as to hide them behind other graphical objects (or, in some cases, to move them "outside" of the bounds of the display 504 or visible portions of the display 504. Thus, in this example, the second portion 508 of the display 504 is no longer being used at all and can be used to display other content, as discussed earlier. The touch-input regions for the now-invisible or now-hidden wager-associated parameter controls may be deactivated, at least with respect to functionality that may change the wager-associated parameters. Thus, for example, the first touch-input region 532 may no longer function to select the single payline option when the VBD 516 is in the second graphical state (although it may be caused to provide different functionality, as discussed later. When the first graphical state is restored, the touch-input functionality of the touch-input regions for the wager-associated parameter controls may be caused to be restored, thereby allowing the wager-associated parameter controls to be used by a user again to modify wager-associated parameters.

When a player selects the change display state control 544, the VBD 516 may be caused to change from the first graphical state to the second graphical state or vice-versa. The change display state control 544 may, itself, be caused to change as part of such a transition, e.g., to display a different caption ("Minimize Bet Panel" in the first graphical state and "Restore Bet Panel" in the second graphical state, for example).

FIG. 6 depicts a second example VBD that has a second graphical state in which the wager-associated parameter controls are minimized by reducing their size and relocating them as compared with the size and locations of those wager-associated parameter controls in the first graphical state. In FIG. 6, a VBD 616 is depicted that has a first graphical state that is identical to that of the VBD 516; in the interests of avoiding excess verbosity, the elements of the VBD 616 that are similar or analogous to those in FIG. 5 are not described separately below, but are referenced by callouts sharing the same last two digits as analogous elements in FIG. 5. Unless indicated otherwise below, the descriptions of elements with reference to FIG. 5 may be relied on for such analogous elements in FIG. 6.

In FIG. 6, the second graphical state is achieved by changing the size and location properties for the graphical objects 624 representing the wager-associated parameter controls such that those graphical objects are approximately one third their original size and have all been relocated to a position that corresponds to the change display state control 644. The graphical object for the change display state control 644, in the interim, has been caused to be hidden from view, thereby allowing the minimized and relocated graphical objects 624 for the wager-associated parameter controls to occupy the portion of the display 604 formerly occupied by the change display state control 644. In such an implementation, the touch-input region that is associated with the change display state control 644 in the first graphical state may be maintained for the second graphical state and may, when touched (such as by a player reaching out to touch the minimized and relocated graphical objects 624), cause the second graphical state to transition to the first graphical state, thereby causing the change display state control 644 to become visible again and for the graphical objects 624 for the wager-associated parameter controls to be moved back to the locations they were in in the first graphical state and return back to their original size. In some implementations, the touch-input region for the change display state control may be resized to match the extents of the minimized and relocated graphical objects 624. In some additional or alternative such implementations, the change display state control 644 may be retained (and caused to act as a "restore" display state control to cause the second graphical state to change to the first graphical state when selected) and the minimized and relocated graphical objects 624 may be positioned elsewhere.

As can be seen in FIG. 6, the second portion 608 is somewhat larger than the second portion 508 since the graphical objects 624 for the wager-associated parameter controls are moved to a new location that lies outside of the region occupied by those graphical objects 624 in the first graphical state. The second portion 608 is thus, in this example, the smallest rectangular area that fully overlaps the graphical objects 624 for the wager-associated parameter controls in both the first and second graphical states. In this example, at least some of the graphical objects 624 for the wager-associated parameter controls are moved from a central region 634 of the second portion 608 to a peripheral region 636 of the second portion 608 (it is to be understood that the shading used to indicate the central region 634 and the peripheral region 636 in FIG. 6 is simply a convention used to identify different portions of the second portion 608 rather than actual shading that forms part of the graphical content that is displayed).

It will be understood that other, similar implementations may cause the graphical objects 624 for the wager-associated parameter controls to be moved to different locations when transitioning from the first graphical state to the second graphical state, e.g., off to one side, in a corner, above all of the other graphical objects representing user-selectable controls in the VBD 616, etc., and/or scaled to different sizes, e.g., smaller or larger than the approximate one-third scale shown in the second graphical state of FIG. 6. In some implementations, one or more of the graphical objects 624 for the wager-associated parameter controls may simply be scaled down without relocation, although this may interfere with the display of other content in the second portion 608.

In implementations such as the one shown in FIG. 6, touch-input regions that correspond with the graphical objects 624 for the wager-associated parameter controls in the second graphical state may be disabled or, at the least, configured to not provide functionality allowing for modification of a wager-associated parameters when the VBD 616 is in the second graphical state.

FIG. 7 depicts a third example VBD that has a second graphical state in which the wager-associated parameter controls are moved to one side without any change in size by relocating them in stacked arrangements as compared with the locations of those wager-associated parameter controls in the first graphical state. In FIG. 7, a VBD 716 is depicted that has a first graphical state for a second portion 708 that produces a GUI that is identical to that of the VBD 516; in the interests of avoiding excess verbosity, the elements of the VBD 716 that are similar or analogous to those in FIG. 5 are not described separately below, but are referenced by callouts sharing the same last two digits as analogous elements in FIG. 5. Unless indicated otherwise below, the descriptions of elements with reference to FIG. 5 may be relied on for such analogous elements in FIG. 7.

As can be seen, in the second graphical state, the graphical objects 724 for the wager-associated parameter controls have all been relocated to the left edge of the second portion 708 and arranged so as to appear to be stacked; the top-most graphical objects 724 on the stacks correspond with the graphical objects representing the wager-associated parameter control for the currently selected wager-associated parameters, thereby allowing the user to easily see their current settings (the currently selected denomination is not shown, however, due to a lack of space—this, however, is the wager-associated parameter that is least likely to be changed by the user, however, so its absence from the second graphical state is not likely to leave the player feeling as if they are missing useful information.

It will be readily appreciated that in all three examples discussed above, a significant portion of the VBDs depicted may be freed up for other purposes, e.g., display of graphical content, through the modification of the size, location, visibility, and/or z-order properties of the graphical objects representing the wager-associated parameter controls to produce the second graphical state. In conventional EGMs, as well as newer EGMs having virtual button decks, the button deck real estate tends to remain fixed, with the wager-associated parameter controls occupying generally static locations.

At the same time, switching between the two graphical states allows VBDs to, in effect, switch between two different input states-one in which the user may make wager-associated parameter modifications, and one in which such functionality is disabled, thereby preventing unintentional wager-associated parameter modification.

Figure 8:
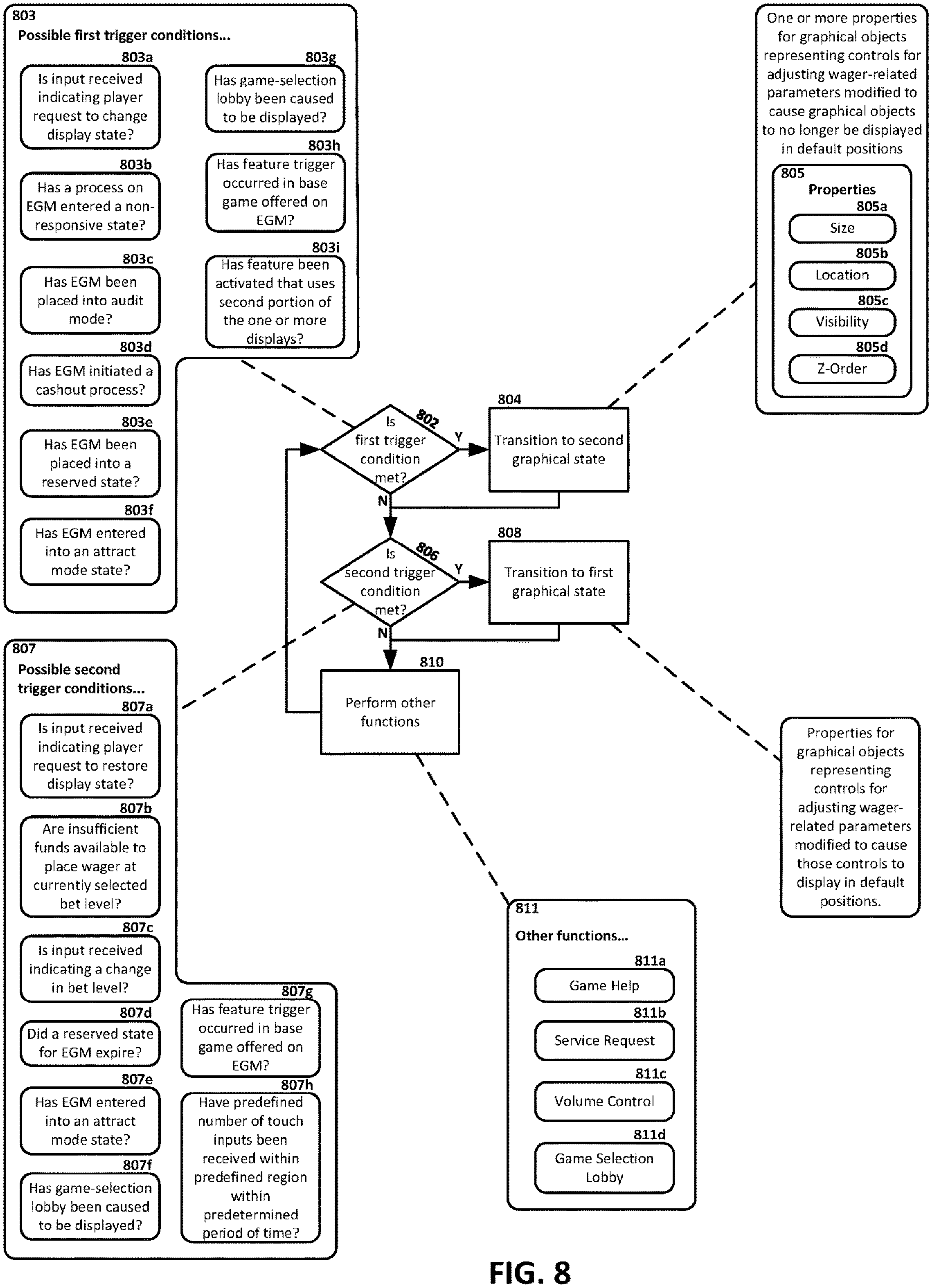
FIG. 8 depicts a flow diagram of a technique for providing for wager-associated parameter control graphical state management.

FIG. 8 depicts a high-level flow diagram of a technique for offering wager-associated parameter control graphical state management. Generally speaking, while the technique shown is represented as a continuous looping inspection technique, similar functionality may be provided using an event-driven technique or other technique, as appropriate.

In FIG. 8, the technique may begin in block 802, in which a determination may be made as to whether one or more first trigger conditions 803 are met. There are a number of possible first trigger conditions 803 that may be evaluated by an EGM implementing the technique of FIG. 8; several of these potential first trigger conditions 803 are discussed below in more detail. It will be understood that an EGM practicing the technique of FIG. 8 may, in various implementations, only review whether a specific one of the first trigger conditions 803, a subset of the first trigger conditions 803, or all of the first trigger conditions 803 is met.

One example first trigger condition 803 is first rigger condition 803*a*, which may be met when input is received indicating a player request to change the display state of the VBD. For example, if the VBD has a change display state control, such as the change display state control 544, that is selected by a player, the signal generated by the change display state control 544 may serve as an input indicating a player request to change the display state. The first trigger condition 803*a* may generally be the predominant mechanism, in many implementations, for causing a VBD to switch from a first graphical state to a second graphical state, such as the first graphical states and second graphical states discussed earlier. This is because such an input generally indicates that the player has set whatever wager-associated parameters they wish to set and now wishes to play the wagering game using those settings without the possibility of accidentally modifying those wager-associated parameters further.

Another potential first trigger condition is first trigger condition 803*b*, which may be met when one or more specified processes on the EGM with the VBD have entered a non-responsive state. For example, if the wagering game in use on the EGM enters a non-responsive state, the first trigger condition 803*b* may be met. In situations where the wagering game has entered a non-responsive state, it may be desirable to prevent the user from modifying, or attempting to modify, the wager-associated parameters, as such attempts may only potentially further complicate the correction of such a non-responsive state. For example, if the player is permitted to change a wager-associated parameter, as may be permitted, in some cases, if the wager-associated parameter modification is controlled by a separate process of the EGM than the non-responsive process, the player may believe the wagering game is still operating normally, which may then cause the player to be confused if the wagering game play proves non-responsive. To avoid such scenarios, the EGM may cause the VBD to transition from the first graphical state to the second graphical state.

Another possible first trigger condition is first trigger condition 803*c*, which may be met when the EGM with the VBD is put into an audit mode, as may be done when, for example, a game outcome is in dispute or otherwise under review. When in audit mode, it may be desirable to disable the wager-associated parameter modification controls, as during audit replay, no wagering activity should actually be occur and there should therefore be no need for any modification of wager-associated parameters.

A further first trigger condition is first trigger condition 803*d*, which may be met when the EGM enters, initiates, or completes, for example, a cashout process. In some implementations, when a player initiates a cashout process, it may be desirable to cause the VBD to transition from the first graphical state to the second graphical state to cause the wager-associated parameter controls to be deactivated. When a cashout process is initiated, it typically signals that the player using the EGM has finished playing, and thus no further wager-associated parameter modification is needed for such a player.

In some jurisdictions, EGMs may be placed in a "reserved" state in which the EGM is temporarily reserved for a particular player. For example, a player may be playing a wagering game and need to leave the EGM, e.g., to go to the bathroom, but wishes to return to the same EGM to continue playing. In such a situation, the player (or perhaps an attendant) may place the EGM into a reserved state for a limited period of time, e.g., 3 minutes. If the player does not return within the allocated period of time, the reserved mode may expire. In some such implementations, the EGM may, upon expiration of the reserved mode, automatically cash the player out and enter an attract mode, thereby indicating that it is available for play. In other such implementations, the EGM may simply exit the reserved mode, with whatever credit is left on the meter being available to the next player to start using the EGM. However, while the reserved mode is active, the EGM will not permit any player to use it unless that player, in some way, is authenticated to the EGM. For example, in some systems, such authentication may be provided based on approval by an attendant, e.g., the attendant, who may have specialized access privileges, may log in to the EGM, may act to authenticate the player and disable the reserved state, thereby placing the EGM back into a non-reserved state. In other such systems, the reserved state may, as part of the enablement process, require entry of a player-input code; when an attempt is made to bring the EGM out of the reserved state, the person triggering such an attempt may be prompted by the EGM to enter that same code.

To avoid or reduce possible attempts by others to use the EGM when in a reserved state, it may be desirable to cause the VBD to switch from the first graphical state to the second graphical state in conjunction with being placed into the reserved state. Since the VBD, in the second graphical state, does not give the appearance that the wager-associated parameters may be modified, other players passing by the EGM may be less likely to try and use the EGM—this may reduce potentially embarrassing encounters between such players and the player that reserved the EGM (when they return). Thus, in such implementations, another potential first trigger condition 803*e* may be met when the EGM is placed into a reserved state.

Another potential first trigger condition that may used in some implementations is first trigger condition 803*f*, which may be met when the EGM is caused to enter an attract mode. Such first trigger conditions may be used when, for example, it is desirable to hide, minimize, or deemphasize the wager-associated parameter modification controls during the attract mode, for example, to allow additional graphics that are part of the attract mode to be displayed where the wager-associated parameter modification controls are displayed in the first graphical state. The attract mode may feature simulated game play, animations selected from various animations played in conjunction with a winning outcome, information regarding potential payouts, game rules, video of past players taken when they achieve a win playing the wagering game offered by the EGM, etc. In some implementations, such a trigger condition may alternatively or additionally be met when a credit meter of the EGM changes to a value of zero or when a credit meter of the EGM indicates a value of zero for a predetermined non-zero period of time, e.g., 30 seconds. Such trigger conditions may also, in some instances, also cause the attract mode to be enabled.

In some EGMs, multiple wagering games may be available for selection by a player-a player may, in such EGMs, be presented with a game selection lobby screen, e.g., a menu allowing the player to select between such multiple wagering games. When playing a wagering game on such EGMs, the player may be provided with a way of accessing such a lobby screen, e.g., via a "lobby" or "game select" button that may be provided on the VBD or on another display, e.g., on a display used to display the first graphical content for the wagering game. In some such implementations, when a player selects such a button to enter the game selection lobby, the presentation of such a lobby, or the input by the player that causes the lobby to be presented, may be cause a first condition 803*g* to be met, which may cause the VBD to enter the second graphical state from the first graphical state. This may be desirable in EGMs, for example, where the VBD may be used to display the lobby. Moreover, it may be desirable to stop displaying, or minimize display of, the wager-associated parameter modification controls while the lobby is being displayed, as the wagering game that is ultimately selected may have different wager-associated parameter options than those that were displayed prior to the display of the lobby.

A further first trigger condition that may be used in some instances is a first trigger condition 803*h*, which may be met when a feature trigger occurs in the wagering game, e.g., when a bonus feature is triggered. In some such implementations, the bonus feature may be configured to utilize a portion of the display used by the VBD to display the wager-associated parameter controls in the first graphical state when in the second graphical state. For example, a wagering game may have a base game in which a feature trigger being met may result in the player being given a choice between a variety of feature options, e.g., being able to play 5 free games with a 4× multiplier or 10 free games with a 2× multiplier; in such an implementation, the player may be presented with user-selectable controls for selecting between such options. Such controls may, for example, be displayed in the second portion of the one or more displays when the second display state is active. In another example, a wagering game or bonus game may require a player to select a particular user-selectable control to reveal an outcome on a symbol; such a control may be shown in the second portion of the one or more displays when the second display state is active. For example, a player may obtain a special wild symbol in a wagering game, bonus game, or free games feature, and may be required to push a "FIRE" button displayed in the second portion to reveal what the special wild symbol will actually represent for the current play.

Another example of a feature trigger may occur, for example, when the wagering game has an "autogamble" feature that may be enabled, which may be activated by the player allow the player to automatically, and repeatedly, play a slot machine. In some instances, such a wagering game may have periodic features that are triggered that allow the player to wager a winning outcome for increased winnings, e.g., by guessing a color or suit of a randomly drawn card. In such implementations, triggering of the gamble feature may cause the second portion to be transitioned from the first graphical display state to the second graphical display state and for a plurality of feature selection controls to be displayed where the wager-associated parameter controls were displayed in the first graphical state. Such feature selection controls may, for example, be configured to allow the player to select a color or suit of the randomly drawn card from the available options for such characteristics.

Another example of a first trigger condition 803 that may be used in some implementations is first trigger 803*i*, which may be met when a feature of the EGM is activated that uses the second portion of the one or more displays. For example, selecting the volume control on the VBD may, in some cases, cause a volume slider control to be shown in the second portion of the one or more displays. In such cases, the second portion of the one or more displays may be transitioned from the first graphical state to the second graphical state, e.g., to hide or relocate the wager-associated parameter controls displayed thereupon, and the volume slide then displayed in their place.

First trigger conditions 803 other than those discussed above may be used in some implementations as well. Regardless of which first trigger condition or conditions are used, when a first trigger condition 803 is met, the second portion of the one or more displays used to display the VBD (or a portion thereof) may be caused to transition from the first graphical state to the second graphical state in block 804. In some implementations, the first trigger conditions may be evaluated only if the second portion of the one or more displays is in the first graphical state-if the second portion of the one or more displays is already in the second graphical state, for example, then there may be no need to evaluate the other first trigger conditions, as the transition from the first graphical to the second graphical state may be superfluous.

As noted earlier, the transition from the first graphical state to the second graphical state may involve the modification of one or more properties 805 of one or more graphical objects representing wager-associated parameter modification controls, such as one or more size properties 805*a*, one or more location properties 805*b*, one or more visibility properties 805*c*, and/or one or more z-order properties 805*d*. Such modification of the properties 805 may cause the associated graphical objects to no longer be displayed in their default positions/appearances.

After transitioning from the first graphical state to the second graphical state in block 804, or if no first trigger condition 803 is deemed to be met in block 802, the technique may proceed to block 806, in which a determination may be made as to whether one or more second trigger conditions 807 are met. If it is determined in block 806 that a second trigger condition is met, the EGM may cause the second portion of the one or more displays to transition from the second graphical state to the first graphical state in block 808, thereby causing the wager-associated parameter modification controls to revert back to their default, "in-use" positions and be enabled for user selection.

As with the first trigger conditions 803, there may be one or more second trigger conditions 807. Several potential second trigger conditions 807 are discussed below in more detail. It will be understood that an EGM practicing the technique of FIG. 8 may, in various implementations and as with the one or more first trigger conditions 803, only review whether a specific one of the second trigger conditions 807, a subset of the second trigger conditions 807, or all of the second trigger conditions 807 is met.

One example second trigger condition, which is a complement of the first trigger condition 803*a*, is second trigger condition 807*a* which may be met when an input is received indicating a request by a player to restore the wager-associated parameter control display and functionality to the default configuration represented by the first graphical state. For example, if the VBD has a restore display state control, similar to the change display state control 544 (it may even be the same control, possibly with a different caption, as shown in FIG. 5), in the second graphical state that is selected by a player, the signal generated by the restore display state control may serve as an input indicating a player request to change the display state back to the first graphical display state. The second trigger condition 807*a* may generally be the predominant mechanism, in many implementations, for causing the second portion of the one or more displays to switch from the second graphical state back to the first graphical state, thereby causing the wager-associated parameter modification control functionality to be restored. This is because a player will, generally speaking, wish to be able to modify the wager-associated parameters during play; it is thus desirable to provide the player with an explicit mechanism for allowing the player to reverse the graphical state change caused, as discussed, by the first trigger conditions 803.

Another potential second trigger condition is second trigger condition 807*b*, which may be met when there are insufficient credits available on the EGM credit meter in order to place a bet in the wagering game using the current selections of wager-associated parameters. For example, if a player's selected wager-associated parameters result in 15 lines being played at a time with a bet multiplier of 3× per line, they would need at least 45 credits on the EGM credit meter. If the EGM only had 40 credits on the credit meter, the player would not be able to place a bet on the EGM unless they changed the wager-associated parameters, e.g., reduce the multiplier from 3× to 2× (resulting in 30 credits being needed to place a wager), reduce the number of lines played from 15 to 10 (also resulting in 30 credits being needed to place a wager), or reduce the denomination (for example, changing from 50 to 10 would effectively quintuple the available credits, e.g., increase the available credits to 200 credits). In order to facilitate such transactions, the EGM may, in some implementations, feature the second trigger condition 807*b*, which may cause the second portion of the one or more displays used to provide the wager-associated parameter controls to transition from the second graphical state back to the first graphical state. Thus, even if the player has caused the wager-associated parameter controls to be hidden or otherwise deemphasized and their functionality to be suspended, the EGM may, in such implementations, automatically cause them to be restored to their default presentation mode and operability when it is likely that the player will wish to make adjustments to the wager-associated parameters based on the credit state of the EGM relative to the current bet level. In some such implementations, only a subset of the graphical objects representing the wager-associated parameter controls may be caused to be displayed in the first graphical state, i.e., the first graphical state may be a modified first graphical state. For example, if there are wager-associated parameter controls that would represent user-selectable options that would, if selected, still result in insufficient funding being available for the bet level defined by the selectable options, then those wager-associated parameter controls may be omitted from the first graphical state in some implementations.

In one such variant, the wagering game may have an autogamble mode in which the EGM repeatedly places wagers using the designated wager-associated parameters; in some instances, e.g., if the player is unlucky, the autogamble feature may cause the player's credit meter to drop below the level at which a further wager may be placed. If this occurs, it may be interpreted by the EGM as a form of second trigger condition, similar to the second trigger condition 807*b*. In such implementations, however, the VBD may be caused to present a residual credit handling feature screen and present options to the player such as PLAY (for the residual credit handling feature), EXIT, or COLLECT. A residual credit handling feature may allow the player to bet some or all of the remaining credit that they have (which is insufficient to place a minimum wager) on a chance to win, for example, an amount of credits sufficient to place a minimum wager in the wagering game or on a free play of the wagering game-if they obtain a losing outcome to this proposition, then their amount of remaining credits may be decreased to zero (or otherwise decreased in accordance with the amount wagered) and they may be required to fund additional credits in order to keep playing. If the player obtains a winning outcome to this proposition, then they would retain the credits that they have and be provided with a free play of the wagering game at some predetermined or randomly selected bet level, an amount of credit(s) sufficient, by itself, to place a minimum bet level wager in the wagering game, or an amount of credit(s) sufficient, in combination with the credits they wagered, to place a minimum bet level wager in the wagering game.

Another potential second trigger condition 807 is second trigger condition 807*c*, which may be met when the EGM receives an input indicating a change in bet level. For example, in some wagering games, there may be additional wager-associated parameter controls provided on interfaces other than the VBD. For example, the first portion of the one or more displays may feature user-selectable controls that are still selectable by the player even when the second portion of the one or more displays is in the second graphical state, thereby rendering the wager-associated parameter modification functionality associated with the wager-associated parameter controls provided in the second portion non-accessible to the player via those controls. The player may still, however, be able to access wager-associated parameter modification functionality through the first portion of the one or more displays in such implementations. For example, there may be one or more user-selectable buttons provided in the first portion of the one or more displays to allow the player to change their denomination, multiplier, lines played, etc. When a player selects such an option, this may cause the second trigger 807*c* to be triggered, thereby causing the second portion of the one or more displays to transition to the first graphical state. This may cause the player to be presented with a full interface via the VBD for selecting between various wager-associated parameters.

Another potential second trigger condition 807 that may be used in some implementations is second trigger condition 807*d*, which may be met when an EGM that is in a reserved state, as discussed earlier with respect to the first trigger condition 803*e*, has its reservation period expire without being affirmatively taken out of its reserved state through action of the reserving player (or an attendant). This may occur, for example, when a player takes longer than the time allocated for the reservation, which may cause the EGM to exit the reserved state and make itself available for any user to use. In tandem with such a change in usability status, the EGM may also cause, in some implementations, the second portion of the one or more displays having the wager-associated controls for the VBD be caused to transition to the first graphical state.

In another similar implementation, a second trigger condition 807*e* may be used that is met when the EGM enters an attract mode, as described earlier with respect to the first trigger condition 803*f*. Thus, some first trigger conditions 803 and second trigger conditions 807 may actually be the same trigger conditions but used to trigger opposite functionality. It will be recognized that in EGMs that utilize one such type of trigger may generally not utilize the other type of trigger (which would act to generally immediately undo the graphical state change caused by the earlier-processed trigger condition). Some EGMs may, however, nonetheless include the ability to process both types of such a triggering condition; in such cases, such EGMs may be configured to allow an administrator or other individual that is given permissions to adjust the operational settings of the EGM to select which of the trigger conditions is to be used. In many implementations, EGMs may be configured to generally allow for an administrator or other individual with access rights that permit modification of the configuration of the EGM to select between various types of first trigger conditions and second trigger conditions that the EGM is configured to be able to process; this may allow the triggering conditions for transitioning between the first graphical state and the second graphical state for the second portion of the one or more displays to be tailored, at least to some extent, to the particular desires of an operator of the EGM.

In the case of attract mode, some EGM operators may prefer to have the wager-associated parameter controls visible during attract mode (in which case the second trigger condition 807*e* may be used) whereas other EGM operators may prefer to have the wager-associated parameter controls invisible, minimized, or otherwise de-emphasized during attract mode (in which case the first trigger condition 803*f* may be used).

Two other examples of second trigger conditions 807 that may be used are second trigger condition 807*f*, which is similar to the first trigger condition 803*g* and which may be triggered when the EGM is caused to present a game selection lobby, and second trigger condition 807*g*, which is similar to the first trigger condition 803*h* and which may be triggered when a feature trigger is triggered in the wagering game. As with the second trigger condition 807*e* and the first trigger condition 803*f*, the second trigger conditions 807*f* and 807*g* and the first trigger conditions 803*g* and 803*h* may be used to cause the wager-associated parameter controls in the second portion of the one or more displays to be selectively made invisible or minimized (and the wager-associated parameter modification functionality associated therewith disabled) or made visible (and usable) in their default positions, depending on the desires of the EGM operator or the design of the wagering game.

Another second trigger condition 807 that may be used in some EGMs is second trigger condition 807*h*, which may be met when one or more user inputs are received to a predefined region of the one or more displays within a predefined period of time. Such inputs may, for example, be touch inputs that are provided through a touch interface of the EGM. The predefined region may, for example, be the second portion of the one or more displays, a composite region that is composed of the touch-input regions for each wager-associated parameter control that may be hidden in the second graphical state (i.e., regions of the touch interface that correspond with the locations where those wager-associated parameter controls would be shown in the first graphical state), any region of the second portion of the one or more displays that does not otherwise correspond with a touch-input region for a displayed user-selectable control in the second graphical state, or any region of the one or more displays that is used to provide a VBD. The second trigger condition 807*h* may generally be configured so as to be met when the inputs provided to the EGM indicate that the user is likely trying to cause the second portion of the one or more displays to transition back to the first graphical state to allow the player to access the wager-associated parameter controls in order to modify various wager-associated parameters of the EGM, but is having difficulty with causing the EGM to do so. Thus, for example, the user may repeatedly tap a region or regions of the one or more displays where such wager-associated parameter controls are normally displayed in the first graphical state (but are perhaps not displayed in the second graphical state), frustrated that they cannot get the wager-associated parameter controls to be displayed in their default, in-use configuration again. Or the user may simply be tapping random locations on the VBD in an attempt to find a "hidden" button that may restore the wager-associated parameter control functionality to the VBD. The predefined number of inputs and the predefined period of time may thus be selected to align with such potential characteristics of the behavior of a frustrated user. For example, the predefined number may be 2, 3, 4, or 5 inputs and the may be received within a predetermined period of time of 1, 2, or 3 seconds in some cases. Other predefined numbers of inputs and predetermined periods of time may be used as well, as appropriate. In some implementations, the predefined region(s) of the second trigger condition 807*h* may be fixed in location, as discussed in the above examples, but in other implementations, the predefined regions may be "floating" regions. For example, in one example variant of the second trigger condition 807*h*, the second trigger condition 807*h* may be met if X consecutive user inputs are received within any region of a predetermined size, e.g., a one-inch diameter circular region, within a predetermined period of time Y (in some implementations, the region may also be further qualified to not include portions of the touch-input interface that correspond to touch-input regions for displayed user-selectable controls). X and Y may, for example, be 2, 3, 4, or 5, and 1, 2, or 3 seconds, for example, although other values are contemplated as well, e.g., time periods extending across fractional portions of seconds.

In some such implementations, the second trigger condition 807*h* may be a composite second trigger condition in which the first part is met as discussed above and the EGM may then cause, when the first part is met, a confirmation dialog to be presented to the user, e.g., a pop-up message that includes a caption like "Restore bet buttons?" or "Enable bet buttons?" and buttons for "Yes" or "No." Such a confirmation may be accompanied by the play of a sound effect to draw the player's attention to the presentation of the confirmation. If the player selects "Yes," this may act to satisfy the second part of the composite second trigger condition, thereby causing the second trigger condition to be fully met. If the player selects "No," this causes the second trigger condition to not be met. In some implementations, the confirmation dialog may be modal in nature, i.e., prevent any interaction with at least the second portion of the one or more displays from occurring except for interaction with the Yes/No buttons of the confirmation dialog. In some further or alternative implementations, the confirmation dialog may be time-based, e.g., the confirmation dialog may disappear (and the EGM may assume that the response to the confirmation dialog is "No") if no user input to the confirmation dialog is received within a predetermined period of time from when it is initially displayed, e.g., within 3 seconds or 5 seconds.

If it is determined in block 806 that one or more second trigger conditions are met, the technique may proceed to block 808, in which the EGM may cause the second portion of the one or more displays to transition from the second graphical state to the first graphical state, in which the properties 805 for the graphical objects representing wager-associated parameter controls that were modified as part of the transition from the first graphical state to the second graphical state may be restored to their default values. It will be appreciate that the block 806 may also include the performance of a preliminary check to see whether the second portion of the one or more displays is in the first graphical state or the second graphical state prior to evaluating the one or more second trigger conditions 807; if the second portion of the one or more displays is in the first graphical state already, then the EGM may forego evaluating the one or more second trigger conditions since there is no need to.

After transitioning from the second graphical state to the first graphical state in block 808, or if no second trigger condition 807 is deemed to be met in block 806, the technique may proceed to block 810, in which various other functions 811 may be performed, e.g., if the "service" button is selected, a communication may be sent to a server indicating that the player wishes to have an attendant come to the EGM, or if the "help" button is selected, then the EGM may cause instructions for playing the wagering game to be displayed on the VBD or on the main wagering game display (pressing the "help" button may serve as another type of first trigger condition, especially if the help information is to be displayed on the VBD-hiding, moving, and/or resizing the wager-associated parameter controls may free up screen space on the VBD that may be used to display help information; alternatively, the help information may be displayed in the first portion of the one or more displays, but the second portion of the one or more displays may be caused to enter the second graphical state and various controls configured to allow the user to navigate through the help information, such as arrows to traverse backwards or forwards through the help information and an EXIT button to exit the help information interface, may be presented). Another example of other functionality that may be performed in block 810 is functionality relating the play of the wagering game itself, e.g., when the play button 518 is pressed, for example. Such functionality may generally involve user-selectable controls that are still accessible and usable in the second graphical state.

It will be appreciated that block 810 may be optionally performed in between blocks 802 and 806 (instead of in between blocks 806 and 802 as shown), in between blocks 802 and 806 and in between blocks 806 and 802, or in parallel with blocks 802 and 806.

The technique may then return to block 802, and the above determinations repeated in a generally cyclic nature so as to check if first or second trigger conditions are met and/or cause other EGM functionality to be performed, and to transition the second portion of the one or more displays, as needed, between the first and second graphical states according to the first and second triggering conditions, as discussed above. It will be further appreciated that in some implementations, not all wager-associated parameter controls may be represented by the graphical objects that have properties that are affected by the transition between the first and second graphical states. For example, in some instances, a graphical object representing a control for modifying the denomination for the wagering game may be displayed (and be selectable to change the denomination) regardless of whether the second portion of the one or more displays is in the first graphical state or the second graphical state.

It will be further appreciated that some EGMs may provide varying degrees of granularity to such implementations, e.g., providing, in effect, a plurality of second portions of the one or more displays, with each second portion corresponding to one or more graphical objects representing a wager-associated parameter control. For example, in some EGMs, there may be a "first" second portion of the one or more displays that includes the graphical objects representing wager-associated parameter controls for adjusting a multiplier value (for multiplying the number of credits bet in each wagering opportunity), a "second" second portion of the one or more displays that includes the graphical objects representing wager-associated parameter controls for adjusting a paylines value (for adjusting the number of paylines played for a given play of the wagering game), and a "third" second portion of the one or more displays that includes the graphical object(s) representing wager-associated parameter controls for adjusting a denomination value. In such implementations, each such second portion may be switched between a corresponding first and second graphical state based on corresponding first and second trigger conditions being met. Thus, for example, a player may be provided with user-selectable controls allowing the player to selectively cause the "first," "second," and/or "third" second portion(s) to be hidden from view. This may allow the player, for example, to hide the user-selectable controls for modifying the denomination and the paylines parameters but retain the user-selectable controls for modifying the multiplier value for each wager.

It will be recognized that the above concepts may be implemented in a number of ways, up to and including implementations in which the graphical object(s) for each wager-associated parameter control can be individually caused to be hidden (or minimized) by a player through appropriate selection of one or more user-selectable controls. For example, in some implementations, an EGM may present a user-selectable change display state control that may, when pressed, cause the EGM to enter into a mode where the user may select one or more of the graphical objects representing individual wager-associated parameter controls and then select the change display state control again (or select another control, e.g., a "confirm," "hide," or "minimize" control) that causes the selected wager-associated parameter controls to be hidden or minimized. In this manner, a player may cause only the wager-associated parameter controls that they wish to have displayed and selectable to be displayed and selectable. In some such implementations, the EGM may be configured to cause the change display state control to act as an "edit" display state control, allowing the EGM to be transitioned between an edit display state mode in which the graphical objects for wager-associated graphical controls can be selected for display or hiding/minimization in association with the second graphical state (in the edit display state mode the normal functionality of such controls would be disabled) and a normal display state mode in which the graphical objects selected in the edit display mode would be presented in the second graphical state. In some implementations, the edit display mode may differentiate between graphical objects selected for hiding/minimization and graphical objects that are not selected for hiding/minimization by, for example, presenting the former in a different visual format, e.g., with a glowing aura (or causing the latter to be presented with a glowing aura and the former to not be presented with a glowing aura), greyed out, semi-transparent, marked with an "X" or some other commonly accepted symbol for "no" or "not," etc.

It will be appreciated that in the case of more granular approaches to second graphical states, i.e., where a subset or subsets of the wager-associated parameter controls may be minimized or hidden while another one or more wager-associated parameter controls may not be minimized or hidden, a further modification may be implemented in which the second graphical state may not necessarily feature a change in the size, location, visibility, or z-order for wager-associated parameter controls, but may instead continue presenting such controls in the same locations but with other modifications. For example, the graphical objects representing such controls may be caused to be displayed in greyscale, overlaid with a red "X," or otherwise graphically marked so as to be identified as being inactive; at the same time, the touch-input functionality for such controls may be disabled. A player may thus selectively disable one or more such wager-associated controls, which may generally continue to be displayed as they normally would but with various modifications thereto to indicate their disabled status.

In some implementations, the transitions between the first graphical state and the second graphical state(s) may be configured to be accompanied by sound and/or video effects. For example, there may be a particular sound that is played when transitioning to the first graphical state that serves as an audible cue that the wager-associated parameter controls, and associated functionality, have been restored. The video effects may, for example, include animations or special effects that may complement a theme of the wagering game and that may serve to visually enhance the transition between the first and second graphical states.

It will also be appreciated that, in some implementations, there may be additional first and/or second trigger conditions that may be user-specified, e.g., a user may be able to choose between a variety of pre-defined gestures, e.g., swipe to left, swipe to right, pinch, move in a circle, etc., that may be performed using a touch-screen (or define their own gestures), and have the input of those gestures by that player be interpreted as meeting a first and/or second trigger condition. Input of such gestures may, for example, be interpreted by an EGM as equivalent to the first trigger condition **803*a* or the second trigger condition 807*a***. In some such implementations, once such gestures are defined or selected by a given player, information specifying such settings may be saved, e.g., by a player tracking server, in association with an account associated with that user, allowing those same settings to be retrieved at a later date by other EGMs used by the player and automatically implemented as a first trigger condition and/or a second trigger condition, as appropriate, by EGMs that the player plays in the future.

The above functionality for managing wager-associated parameter control graphical state may be provided in a variety of different manners, including, for example, in the context of an EGM hardware and software stack that may be used to provide wagering game presentations to players in a secure and reliable manner.

Figure 9:
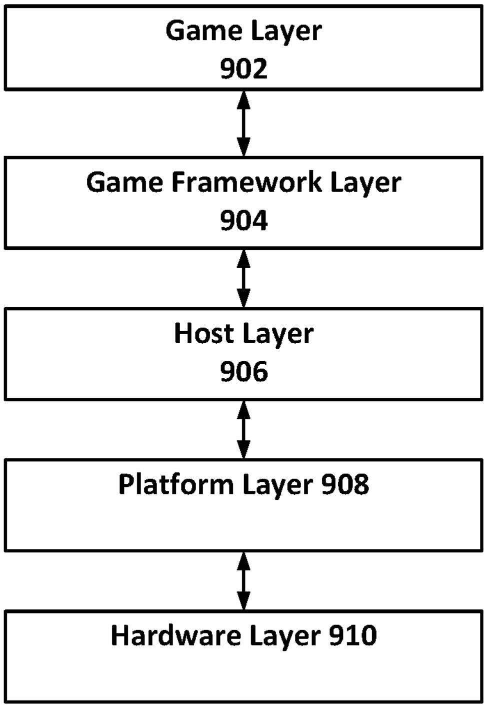
FIG. 9 depicts an example software and hardware stack for an electronic gaming machine.

For example, one such EGM architecture is discussed below with respect to FIG. 9, which depicts a high-level diagram of an example hardware/software stack for an EGM.

In the example hardware/software stack, a hardware layer is provided that may include the processors, memory, display screens, touch-input devices, credit acceptor devices, audio devices, button decks, wheel toppers, reel stepper motors, lighting devices, communications interfaces, and so forth. Such hardware layers may vary greatly from EGM design to EGM design.

A platform layer may be provided that acts to interface with the hardware layer. The platform layer may serve as an interface between the hardware layer and other higher-level layers discussed later below, and may include device drivers for interfacing with the various peripherals that may be part of the hardware layer. The platform layer often includes software for managing and implementing various regulatory agency requirements, such as providing for boot chain security/boot image authentication, intrusion detection monitoring (monitoring physical intrusion sensors), random number generator performance/randomness, communications with other EGMs and/or management servers, and so forth.

In the example hardware/software stack, a host layer, game framework layer, and a game layer are also provided. The host layer may act, in effect, as an interface between the platform layer and the game framework layer. This allows the game framework layer to be platform-agnostic and usable with a wide variety of different platforms.

The game framework layer may, for example, provide a framework or development environment that may be include various common game-related functionality that may be used as a framework for displaying various wagering-game related content. For example, the game framework may define classes that may be used to instantiate objects and methods that may be used to cause a desired configuration of reels and reel stops to be displayed, obtain random outcomes for use in determining wagering game results, and so forth. The game framework layer may include various hooks that allow game developers to customize various aspects of how a wagering game is presented using the game framework layer.

The game layer may be used to provide a particular wagering game or wagering games and may be executed within the context of the game framework layer, e.g., using a graphics engine, for example, that is provided via the game framework layer. For example, the game layer may reference assets that are specific to a particular game, e.g., graphics, sound, video, etc., and may include specialized code that provides functionality specific to a particular game. The game layer may, in some contexts, be thought of as a game plugin, e.g., a mini-program, that runs within the framework of the game framework layer.

In some implementations of EGMs that feature wager-associated parameter control graphical state management, the various aspects of the VBD may be controlled by different layers of the EGM software stack. For example, in some implementations, software executing as part of the platform layer may control the display and operation of some aspects of the VBD, while the remainder of the VBD may be controlled by software executing as part of the game layer. For example, certain core user-selectable controls, such as help, service, cashout, and change display state user-selectable controls, may be controlled by the software executing as part of the platform layer, while other controls, such as the wager-associated parameter controls, the play button, and other controls that may be tailored to the needs of a particular wagering game, may be controlled by the software executing as part of the game layer. In such an implementation, the platform-controlled controls of the VBD would remain the same for each different wagering game provided using that platform, with the game potentially having no capability to override the look, placement, or appearance of such controls.

In another implementation, the VBD may be divided into discrete regions, e.g., a region along one side or along the top that is reserved for platform-controlled user-selectable controls and another region that is reserved for game-controlled user-selectable controls. In this implementation, specific controls are not assigned to the platform or the game layer, but the control of those controls may be determined based on in which region the controls are located. For example, a VBD may be provided as a composite of two different borderless graphics that are adjacent to each other and share a common edge-one such window may be displaying graphics/controls provided through code executing as part of the platform layer, and the other window may be displaying graphics or controls provided through code executing as part of the game layer. To the viewer, the two side-by-side windows may appear to be part of the same seamless VBD, but they may nonetheless be under separate control.

In another implementation, the platform may not be involved in the control of the VBD; the VBD may instead be provided by the game framework layer in response to commands provided by the game layer. For example, the game layer may make one or more calls to the game framework layer to cause the game framework layer to replace one scene with another in order to switch between different graphical states. For example, the game layer could make one or more calls to the game framework layer to replace the currently rendered VBD scene having wager-associated parameter controls with a second VBD scene that excludes the wager-associated parameter controls. For example, to make the wager-associated parameter controls disappear, the game layer may make a call to the game framework layer to have the entire VBD scene with the wager-associated parameter controls be replaced with a second VBD scene. For a second graphical state that includes minimization of the wager-associated parameter controls, the call to the game framework layer may cause the game framework layer to generate a second VBD scene that includes a thumbnail, icon, or a relatively small image of the wager-associated parameter controls to indicate minimization thereof.

In some such implementations, the game framework layer may offer a variety of templates for different layouts of user-selectable controls that may be implemented through calls to the game framework layer by the game layer. Such templates may include, for example, predefined arrangements of controls, including, for examples, various mixes of controls with predefined (generally universal) functionality that is shared between multiple different games (such as volume controls, help buttons, service buttons, cashout buttons, etc.) and controls that are designed to be easily modifiable by the game player, e.g., with custom color schemes, text, font, graphics, animations, sound effects, and so forth. While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming machine comprising:

one or more displays, wherein:

a first portion of the one or more displays is oriented in an upright manner, and a second portion of the one or more displays is located below the first portion of the one or more displays and includes a surface that is substantially horizontal;

a touch-input interface having a first touch-input region that is located in the second portion and is configured to detect touch events; and a game controller that includes one or more processors and one or more memory devices, wherein:

the one or more processors, the one or more memory devices, and the one or more displays are operably connected, and the one or more memory devices store computer-executable instructions for controlling the one or more processors to:

cause a first wagering game to be presented via first graphical content displayed within at least the first portion of the one or more displays during a gaming session for a player of the first wagering game;

cause second graphical content displayed in the second portion of the one or more displays during the gaming session to transition from a first graphical state to a second graphical state responsive to a determination that one or more first trigger conditions are met; and cause the second graphical content displayed in the second portion of the one or more displays to transition from the second graphical state to the first graphical state responsive to a determination that one or more second trigger conditions are met, wherein:

a) the second graphical content displayed in the second portion of the one or more displays in the first graphical state includes a first set of one or more graphical objects that includes a first graphical object representing a first user-selectable wager-associated parameter control, the first set of one or more graphical objects further including a change display graphical object representing a change display state control, and the change display state control is not a wager-associated parameter control, b) the second graphical content displayed in the second portion of the one or more displays in the second graphical state differs from the second graphical content displayed in the second portion of the one or more displays in the first graphical state at least in that the first graphical object experiences a change in one or more properties from the first graphical state to the second graphical state, each property selected from the group consisting of: size, location, visibility, and z-order, c) the first user-selectable wager-associated parameter control is, when the second graphical content displayed in the second portion of the one or more displays is in the first graphical state, associated with the first touch-input region of the touch-input interface, and d) the one or more memory devices store further computer-executable instructions for controlling the one or more processors to:

cause a wager-associated parameter associated with the first wagering game to change responsive to a determination that a touch input associated with the first graphical object has been received via the first touch-input region of the touch-input interface while the second graphical content displayed in the second portion of the one or more displays is in the first graphical state, cause the wager-associated parameter associated with the first wager game to not change responsive to a touch event in the first touch-input region when the second graphical content displayed in the second portion of the one or more displays is in the second graphical state, and cause the second graphical content in the second portion of the one or more displays to change from one of the first graphical state and the second graphical state to the other of the first graphical state and the second graphical state responsive, at least in part, to the change display graphical object being selected by a user.

2. The electronic gaming machine of claim 1, wherein:

the first set of one or more graphical objects includes a plurality of graphical objects, and the second graphical content displayed in the second portion of the one or more displays in the second graphical state differs from the second graphical content displayed in the second portion of the one or more displays in the first graphical state in that all of the graphical objects in the plurality of graphical objects experience a change in one or more properties from the first graphical state to the second graphical state, each property selected from the group consisting of: size, location, visibility, and z-order.

3. The electronic gaming machine of claim 1, wherein the one or more first trigger conditions include one or more of: a first trigger condition that is met when a determination is made that a process executing on the electronic gaming machine has entered a non-responsive state, a first trigger condition that is met when the electronic gaming machine is placed into an audit mode, a first trigger condition that is met when the electronic gaming machine is caused to perform a cashout process, and a first trigger condition that is met when the electronic gaming machine is placed into a reserved mode.

4. The electronic gaming machine of claim 3, wherein the one or more second trigger conditions include one or more of: a second trigger condition that is met when a determination is made that a user input associated with a restore display state control associated with the first set of one or more graphical objects is received, a second trigger condition that is met when a feature trigger occurs from within the first wagering game, a second trigger condition that is met when a determination is made that one or more user inputs indicating a wager parameter change are received, and a second trigger condition that is met when a determination is made that one or more user inputs indicating a denomination change are received, and a second trigger condition that is met when the electronic gaming machine is in a reserved state and a timer associated with the reserved state reaches an expired state before the electronic gaming machine is taken out of the reserved state.

5. The electronic gaming machine of claim 4, wherein:

the one or more second trigger conditions include the second trigger condition that is met when the determination is made that the user input associated with the restore display state control associated with the first set of one or more graphical objects is received, and the restore display state control and the change display state control are the same control.

6. The electronic gaming machine of claim 1, wherein the one or more first trigger conditions or the one or more second trigger conditions include a first trigger condition or a second trigger condition, respectively, that is met when the electronic gaming machine enters into a state selected from the group consisting of: an attract mode state, a first zero-credit state that is enabled when a credit meter of the electronic gaming machine changes to a value of zero, and a second zero-credit state that is enabled when the credit meter of the electronic gaming machine indicates a value of zero for at least a predetermined non-zero period of time.

7. The electronic gaming machine of claim 1, wherein:
the first wagering game features a plurality of bet levels,
the first set of one or more graphical objects includes a plurality of graphical objects,
the plurality of graphical objects includes the first graphical object and one or more additional graphical objects, each additional graphical object representing a different user-selectable wager-associated parameter control,
the first user-selectable wager-associated parameter control and the one or more additional user-selectable wager-associated parameter controls represent a graphical user interface that is configured to receive one or more inputs indicating a selection of one of the bet levels for use in one or more plays of the first wagering game, and
the one or more second trigger conditions include a second trigger condition that is met when a credit meter that indicates an amount of credit available for placing a wager in the first wagering game indicates a credit value that is lower than an amount of credit needed to place a bet based on the selected bet level.

8. The electronic gaming machine of claim 1, wherein:
the one or more second trigger conditions include a second trigger condition that is met when X touch inputs are received within Y seconds within a region of the second portion of the one or more displays having a predetermined size,
X is an integer greater than 1,
Y is a value greater than 0, and
none of the X touch inputs correspond in location with a displayed user-selectable control.

9. The electronic gaming machine of claim 1, wherein:
the one or more memory devices store further computer-executable instructions for controlling the one or more processors to cause the electronic gaming machine to enter, responsive to receipt of one or more inputs, a game selection state in which a wagering game selection lobby is caused to be presented via the one or more displays,
the wagering game selection lobby is configured to allow a player to select between the first wagering game and one or more other wagering games for play on the electronic gaming machine, and
the one or more first trigger conditions or the one or more second trigger conditions include a first trigger condition or a second trigger condition, respectively, that is met when the wagering game selection lobby is caused to be displayed.

10. The electronic gaming machine of claim 1, wherein the one or more memory devices store further computer-executable instructions for controlling the one or more processors to:
implement a platform layer that interfaces with hardware of the electronic gaming machine,
implement a game framework layer that provides commonly used subroutines for providing wagering game features,
implement a host layer that provides for communication between the platform layer and the game framework layer, and
implement a game layer that interfaces with the game framework layer and is configured to make calls to the game framework layer to cause the game framework layer to present the first set of one or more graphical objects as part of the first graphical state for the second portion and to cause the one or more properties for the first graphical object to change from the first graphical state to the second graphical state.

11. The electronic gaming machine of claim 10, wherein the game layer is further configured to present the first set of one or more graphical objects by referencing a template and modifying the template according to commands received from the game layer.

12. The electronic gaming machine of claim 1, wherein the one or more memory devices store further computer-executable instructions for controlling the one or more processors to:
implement a platform layer that interfaces with hardware of the electronic gaming machine and is configured to control the properties of at least one graphical object other than the first graphical object,
implement a game framework layer that provides commonly used subroutines for providing wagering game features,
implement a code layer that provides for communication between the platform layer and the game framework layer, and
implement a game layer that interfaces with the game framework layer and is configured to control the properties of at least the first graphical object.

13. One or more non-transitory computer-readable media storing computer-executable instructions that, when executed by one or more processors of a gaming machine, cause the one or more processors to:
cause a first wagering game to be presented via first graphical content displayed within at least a first portion of one or more displays of the gaming machine during a gaming session for a player of the first wagering game;
cause second graphical content displayed in a second portion of the one or more displays of the gaming machine during the gaming session to transition from a first graphical state to a second graphical state responsive to a determination that one or more first trigger conditions are met, wherein the second portion of the one or more displays is located below the first portion of the one or more displays; and
cause the second graphical content displayed in the second portion of the one or more displays to transition from the second graphical state to the first graphical state responsive to a determination that one or more second trigger conditions are met, wherein:
a) the second graphical content displayed in the second portion of the one or more displays in the first graphical state includes a first set of one or more graphical objects that includes a first graphical object representing a first user-selectable wager-associated parameter control, the first set of one or more graphical objects further including a change display graphical object representing a change display state control, and the change display state control is not a wager-associated parameter control, b) the second graphical content displayed in the second portion of the one or more displays in the second graphical state differs from the second graphical content displayed in the second portion of the one or more displays in the first graphical state at least in that the first graphical object experiences a change in one or more properties from the first graphical state to the second graphical state, each property selected from the group consisting of: size, location, visibility, and z-order, c) the first user-selectable wager-associated parameter control is, when the second graphical content displayed in the second portion of the one or more displays is in the first graphical state, associated with a first touch-input region of a touch-input interface that is located in the second portion and configured to at least detect a touch event associated with the first user-selectable wager-associated parameter control, and d) the one or more non-transitory computer-readable media store further computer-executable instructions that, when executed by one or more processors, further cause the one or more processors to:

cause a wager-associated parameter associated with the first wagering game to change responsive to a determination that a touch input associated with the first graphical object has been received via the first touch-input region of the touch-input interface while the second graphical content displayed in the second portion of the one or more displays is in the first graphical state, cause the wager-associated parameter associated with the first wager game to not change when the second graphical content displayed in the second portion of the one or more displays is in the second graphical state, and cause the second graphical content in the second portion of the one or more displays to change from one of the first graphical state and the second graphical state to the other of the first graphical state and the second graphical state responsive, at least in part, to the change display graphical object being selected by a user.

14. The one or more non-transitory computer-readable media of claim 13, wherein:

the first set of one or more graphical objects includes a plurality of graphical objects, and the second graphical content displayed in the second portion of the one or more displays in the second graphical state differs from the second graphical content displayed in the second portion of the one or more displays in the first graphical state in that all of the graphical objects in the plurality of graphical objects experience a change in one or more properties from the first graphical state to the second graphical state, each property selected from the group consisting of: size, location, visibility, and z-order.

15. The one or more non-transitory computer-readable media of claim 13, wherein:

the one or more second trigger conditions include a second trigger condition that is met when X touch inputs are received within Y seconds within a region of the second portion of the one or more displays having a predetermined size, X is an integer greater than 1, Y is a value greater than 0, and none of the X touch inputs correspond in location with a displayed user-selectable control.

16. The one or more non-transitory computer-readable media of claim 13, wherein:

the first wagering game features a plurality of bet levels, the first set of one or more graphical objects includes a plurality of graphical objects, the plurality of graphical objects includes the first graphical object and one or more additional graphical objects, each additional graphical object representing a different user-selectable wager-associated parameter control, the first user-selectable wager-associated parameter control and the one or more additional user-selectable wager-associated parameter controls represent a graphical user interface that is configured to receive one or more inputs indicating a selection of one of the bet levels for use in one or more plays of the first wagering game, and the one or more second trigger conditions include a second trigger condition that is met when a credit meter that indicates an amount of credit available for placing a wager in the first wagering game indicates a credit value that is lower than an amount of credit needed to place a bet based on the selected bet level.

17. A method, implemented by a game controller of an electronic gaming machine having one or more displays, comprising:

causing, by the game controller, a first wagering game to be presented via first graphical content displayed within at least a first portion of the one or more displays of the electronic gaming machine during a gaming session for a player of the first wagering game;

causing, by the game controller, second graphical content displayed in a second portion of the one or more displays of the electronic gaming machine during the gaming session to transition from a first graphical state to a second graphical state responsive to a determination that one or more first trigger conditions are met, wherein the second portion of the one or more displays is located below the first portion of the one or more displays; and causing, by the game controller, the second graphical content displayed in the second portion of the one or more displays to transition from the second graphical state to the first graphical state responsive to a determination that one or more second trigger conditions are met, wherein:

a) the second graphical content displayed in the second portion of the one or more displays in the first graphical state includes a first set of one or more graphical objects that includes a first graphical object representing a first user-selectable wager-associated parameter control, the first set of one or more graphical objects further including a change display graphical object representing a change display state control, and the change display state control is not a wager-associated parameter control, b) the second graphical content displayed in the second portion of the one or more displays in the second graphical state differs from the second graphical content displayed in the second portion of the one or more displays in the first graphical state at least in that the first graphical object experiences a change in one or more properties from the first graphical state to the second graphical state, each property selected from the group consisting of: size, location, visibility, and z-order, c) the first user-selectable wager-associated parameter control is, when the second graphical content displayed in the second portion of the one or more displays is in the first graphical state, associated with a first touch-input region of a touch-input interface that is located in the second portion and configured to at least detect a touch event associated with the first user-selectable wager-associated parameter control, d) causing, by the game controller, a wager-associated parameter associated with the first wagering game to change responsive to a determination that a touch input associated with the first graphical object has been received via the first touch-input region of the touch-input interface while the second graphical content displayed in the second portion of the one or more displays is in the first graphical state, e) causing, by the game controller, the wager-associated parameter associated with the first wager game to not change when the second graphical content displayed in the second portion of the one or more displays is in the second graphical state, and f) causing the second graphical content in the second portion of the one or more displays to change from one of the first graphical state and the second graphical state to the other of the first graphical state and the second graphical state responsive, at least in part, to the change display graphical object being selected by a user.

18. The method of claim 17, wherein:

the first set of one or more graphical objects includes a plurality of graphical objects, and the second graphical content displayed in the second portion of the one or more displays in the second graphical state differs from the second graphical content displayed in the second portion of the one or more displays in the first graphical state in that all of the graphical objects in the plurality of graphical objects experience a change in one or more properties from the first graphical state to the second graphical state, each property selected from the group consisting of: size, location, visibility, and z-order.

19. The method of claim 17, wherein:

the one or more second trigger conditions include a second trigger condition that is met when X touch inputs are received within Y seconds within a region of the second portion of the one or more displays having a predetermined size, X is an integer greater than 1, Y is a value greater than 0, and none of the X touch inputs correspond in location with a displayed user-selectable control.

20. The method of claim 17, wherein:

the first wagering game features a plurality of bet levels, the first set of one or more graphical objects includes a plurality of graphical objects, the plurality of graphical objects includes the first graphical object and one or more additional graphical objects, each additional graphical object representing a different user-selectable wager-associated parameter control, the first user-selectable wager-associated parameter control and the one or more additional user-selectable wager-associated parameter controls represent a graphical user interface that is configured to receive one or more inputs indicating a selection of one of the bet levels for use in one or more plays of the first wagering game, and the one or more second trigger conditions include a second trigger condition that is met when a credit meter that indicates an amount of credit available for placing a wager in the first wagering game indicates a credit value that is lower than an amount of credit needed to place a bet based on the selected bet level.

* * * * *